US010545500B2

(12) United States Patent
Schubert et al.

(10) Patent No.: US 10,545,500 B2
(45) Date of Patent: Jan. 28, 2020

(54) MODEL FOR DETERMINING DROP-OFF SPOT AT DELIVERY LOCATION

(71) Applicant: Wing Aviation LLC, Mountain View, CA (US)

(72) Inventors: Martin Schubert, Mountain View, CA (US); Philip Watson, Santa Cruz, CA (US); Michael Grundmann, San Jose, CA (US); Gabriella Levine, San Francisco, CA (US)

(73) Assignee: Wing Aviation LLC, Mountain View, CA (US)

( * ) Notice: Subject to any disclaimer, the term of this patent is extended or adjusted under 35 U.S.C. 154(b) by 98 days.

(21) Appl. No.: 15/667,180

(22) Filed: Aug. 2, 2017

(65) Prior Publication Data

US 2019/0041852 A1    Feb. 7, 2019

(51) Int. Cl.
*B05D 1/00*       (2006.01)
*G06N 3/04*       (2006.01)
(Continued)

(52) U.S. Cl.
CPC ......... *G05D 1/0088* (2013.01); *G05D 1/0044* (2013.01); *G06N 3/04* (2013.01);
(Continued)

(58) Field of Classification Search
CPC ...... G05D 1/0022; G05D 1/0088; G05D 1/00; G05D 1/0044; G06Q 10/083;
(Continued)

(56) References Cited

U.S. PATENT DOCUMENTS 7,353,110 B2    4/2008  Kim
7,657,466 B2    2/2010  Klingenberg et al.
(Continued)

FOREIGN PATENT DOCUMENTS

WO    WO 2016/141100        9/2016

OTHER PUBLICATIONS

PCT International Search Report and Written Opinion issued in International Application No. PCT/US2018/043478, dated Nov. 2, 2018, 17 pages.
(Continued)

*Primary Examiner* — Hunter B Lonsberry
*Assistant Examiner* — Luis A Martinez Borrero
(74) *Attorney, Agent, or Firm* — Christensen O'Connor Johnson Kindness PLLC

(57) ABSTRACT

An example system includes a delivery vehicle, a sensor connected to the delivery vehicle, and a control system that determines a delivery destination for an object. The control system receives sensor data representing a physical environment of at least a portion of the delivery destination and determines a drop-off spot for the object within the delivery destination by way of an artificial neural network (ANN). The ANN is trained to determine the drop-off spot based on previously-designated drop-off spots within corresponding delivery destinations and includes an input node that receives the sensor data, hidden nodes connected to the input node, and an output node connected to the hidden nodes that provides data indicative of a location of the drop-off spot. The control system additionally causes the delivery vehicle to move to and place the object at the drop-off spot.

20 Claims, 16 Drawing Sheets

(51) Int. Cl.
*G06Q 10/08* (2012.01)
*B64C 39/02* (2006.01)
*G05D 1/00* (2006.01)

(52) U.S. Cl.
CPC ........ *G06Q 10/0836* (2013.01); *B64C 39/024* (2013.01); *B64C 2201/128* (2013.01); *B64C 2201/145* (2013.01)

(58) Field of Classification Search
CPC .... G06Q 30/0261; G06Q 10/08; G06Q 30/02; G06N 3/04
See application file for complete search history.

(56) References Cited

U.S. PATENT DOCUMENTS

| | | | |
|---|---|---|---|
| 8,577,538 B2* | 11/2013 | Lenser | G05D 1/0274 701/2 |
| 8,743,244 B2 | 6/2014 | Vartanian et al. | |
| 8,949,016 B1 | 2/2015 | Ferguson et al. | |
| 9,096,354 B2 | 8/2015 | Baudson et al. | |
| 9,150,224 B2 | 10/2015 | Yopp | |
| 9,177,481 B2 | 11/2015 | Wang et al. | |
| 9,336,506 B2 | 5/2016 | Shucker et al. | |
| 9,359,074 B2 | 6/2016 | Ganesh et al. | |
| 9,459,620 B1 | 10/2016 | Schaffalitzky | |
| 9,481,367 B1* | 11/2016 | Gordon | B60W 30/09 |
| 9,488,979 B1 | 11/2016 | Chambers et al. | |
| 9,743,239 B1* | 8/2017 | Mishra | H04W 4/023 |
| 10,134,066 B2* | 11/2018 | Hariharan | G06Q 30/06 |
| 2005/0084975 A1 | 4/2005 | Armentrout | |
| 2005/0251324 A1 | 11/2005 | Wiener et al. | |
| 2007/0124266 A1 | 5/2007 | Hearing et al. | |
| 2007/0198159 A1 | 8/2007 | Durkos et al. | |
| 2008/0027591 A1* | 1/2008 | Lenser | G05D 1/0251 701/2 |
| 2008/0161987 A1 | 7/2008 | Breed | |
| 2012/0028680 A1 | 2/2012 | Breed | |
| 2012/0030133 A1 | 2/2012 | Rademaker | |
| 2012/0083982 A1 | 4/2012 | Bonefas | |
| 2012/0136895 A1 | 5/2012 | Johnson | |
| 2012/0314032 A1 | 12/2012 | Muensterer et al. | |
| 2013/0262274 A1* | 10/2013 | Hariharan | G06Q 30/06 705/27.1 |
| 2013/0282208 A1 | 10/2013 | Mendez-Rodriguez et al. | |
| 2014/0032034 A1 | 1/2014 | Raptopoulos et al. | |
| 2014/0180914 A1 | 6/2014 | Abhyanker | |
| 2014/0180959 A1* | 6/2014 | Gillen | G06Q 10/0838 705/341 |
| 2014/0254896 A1 | 9/2014 | Zhou et al. | |
| 2014/0279658 A1* | 9/2014 | Lievens | G06Q 10/02 705/336 |
| 2014/0330456 A1 | 11/2014 | Morales et al. | |
| 2015/0120094 A1 | 4/2015 | Kimchi et al. | |
| 2015/0149017 A1 | 5/2015 | Attard et al. | |
| 2015/0154559 A1 | 6/2015 | Barbush et al. | |
| 2015/0158599 A1 | 6/2015 | Sisko | |
| 2015/0248640 A1* | 9/2015 | Srinivasan | G06Q 10/08355 705/338 |
| 2015/0253775 A1 | 9/2015 | Jacobus | |
| 2015/0370251 A1 | 12/2015 | Siegel et al. | |
| 2016/0033966 A1 | 2/2016 | Farris et al. | |
| 2016/0107750 A1 | 4/2016 | Yates | |
| 2016/0179096 A1 | 6/2016 | Bradlow et al. | |
| 2016/0200438 A1* | 7/2016 | Bokeno | B64C 39/024 |
| 2016/0314224 A1* | 10/2016 | Wei | G06F 17/5009 |
| 2017/0011333 A1* | 1/2017 | Greiner | G06Q 10/083 |
| 2017/0046653 A1* | 2/2017 | Wilson | G06Q 10/083 |
| 2018/0107211 A1* | 4/2018 | Schubert | G05D 1/0044 |
| 2018/0121875 A1* | 5/2018 | Satyanarayana Rao | G06Q 10/08355 |
| 2018/0130159 A1* | 5/2018 | High | G05D 1/0088 |
| 2018/0155011 A1* | 6/2018 | Greiner | B64D 1/22 |

OTHER PUBLICATIONS

Jing Huang et al., Point Cloud Matching based on 3D Self-Similarity, 2012 IEEE Computer Society Conference on Computer Vision and Pattern Recognition Workshops, Jun. 16-21, 2012, IEEE.

Radu Bogdan Rusu et al., Aligning Point Cloud Views using Persistent Feature Histograms, 2008 IEEE/RSJ International Conference on Intelligent Robots and Systems, Sep. 22-26, 2008, IEEE.

Vit Goncharuk, Markerless Drone Delivery is Indeed Possible, http://augmentedpixels.com/markerless-drone-delivery/, Dec. 2, 2105.

Indoor Navigation Platform, Augmented Pixels, http://www.slideshare.net/augmentedpixels/indoor-navigation-platform, Sep. 8, 2015.

Andrea Cesetti et al., A Vision-Based Guidance System for UAV Navigation and Safe Landing Using Natural Landmarks, Journal of Intelligent and Robotic Systems, Jan. 2010, pp. 233-257, 57(1).

Ayanna Howard et al., Multi-Sensor Terrain Classification for Safe Spacecraft Landing, IEEE Transaction on Aerospace and Electronic Systems, Oct. 2004, vol. 40, Issue 4, pp. 1112-1131.

Navid Serrano et al., Landing Site Selection using Fuzzy Rule-Based Reasoning, Proceedings 2007 IEEE International Conference on Robotics and Automation, Apr. 10-14, 2007, IEEE.

Colin Theodore et al., Flight Trials of a Rotorcraft Unmanned Aerial Vehicle Landing Autonomously at Unprepared Sites, American Helicopter Society 62nd Annual Forum, Phoenix, AZ, May 9-11, 2006.

Connor A Theilmann, Integrating Autonomous Drones into the National Aerospace System, Senior Capstone Thesis, University of Pennsylvania School of Engineering and Applied Science, Department of Computer and Information Science, Apr. 29, 2015.

Sven Lange et al., Autonomous Landing for a Multirotor UAV Using Vision, Workshop Proceedings of SI MPAR 2008 International Conference of Simulation, Modeling, and Programming for Autonomous Robots, Nov. 2008, pp. 482-491.

Stephen M. Chaves et al., NEEC Research: Toward GPS-denied Landing of Unmanned Aerial Vehicles on Ships at Sea, Naval Engineers Journal, 2015, vol. 127, Issue 1, pp. 23-35.

Weiwei Kong et al., Autonomous Landing of an UAV with a Ground-Based Actuated Infrared Stereo Vision System, 2013 IEEE/RSJ International Conference on Intelligent Robots and Systems, Nov. 3-7, 2013.

Pal Moen Most, Visual Navigation of an autonomous drone, Master of Science in Informatics thesis at Norwegian University of Science and Technology Department of Computer and Information Science, Feb. 1, 2014.

Fabrizio Lamberti et al., Mixed Marker-Based/Marker-Less Visual Odometry System for Mobile Robots, International Journal of Advanced Robotic Systems, vol. 10, 2013.

Miguel A Olivares-Mendez et al., Fuzzy Controller for UAV-landing task using 3D-position Visual Estimation, 2010 IEEE International Conference on Fuzzy Systems (FUZZ), Jul. 18-23, 2010.

Abder Larranaga-Cepeda et al., On-line dense point cloud generation from monocular images with scale estimation, 13th Mexican International Conference on Artificial Intelligence, MICAI 2014, Tuxtla Gutiérrez, Mexico, Nov. 16-22, 2014. Proceedings, Part I.

Eddie Krassenstein, Drone Package Delivery is Here! 1st FAA Approved Delivery by 3D Printed Flirtey Drone Takes Place Next Month, 3D Printing.com, https://3dprint.com/75895/flirtey-drone-delivery/.

Laura Wenus, Self Propelling Delivery Robots Testing in the Mission, Mission Local, Feb. 21, 2017.

* cited by examiner

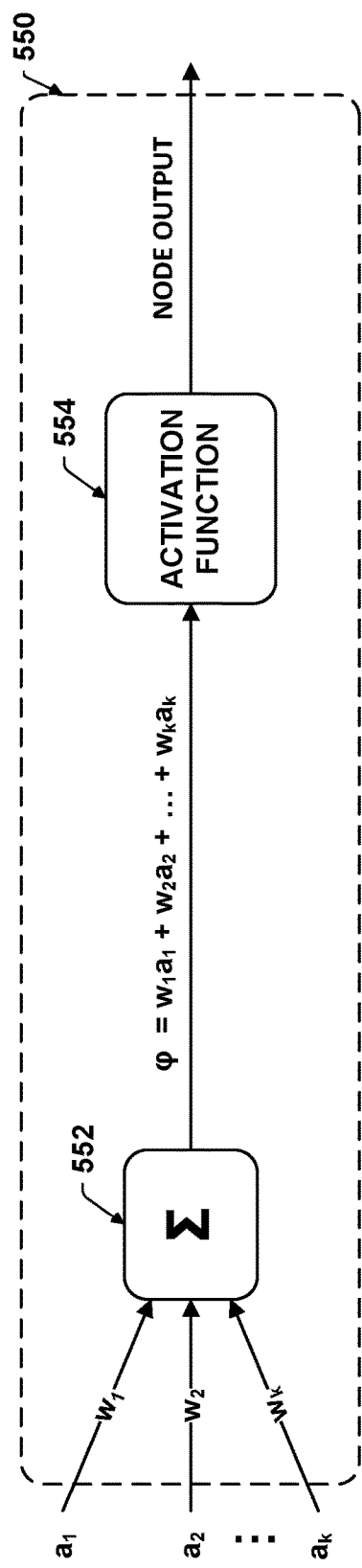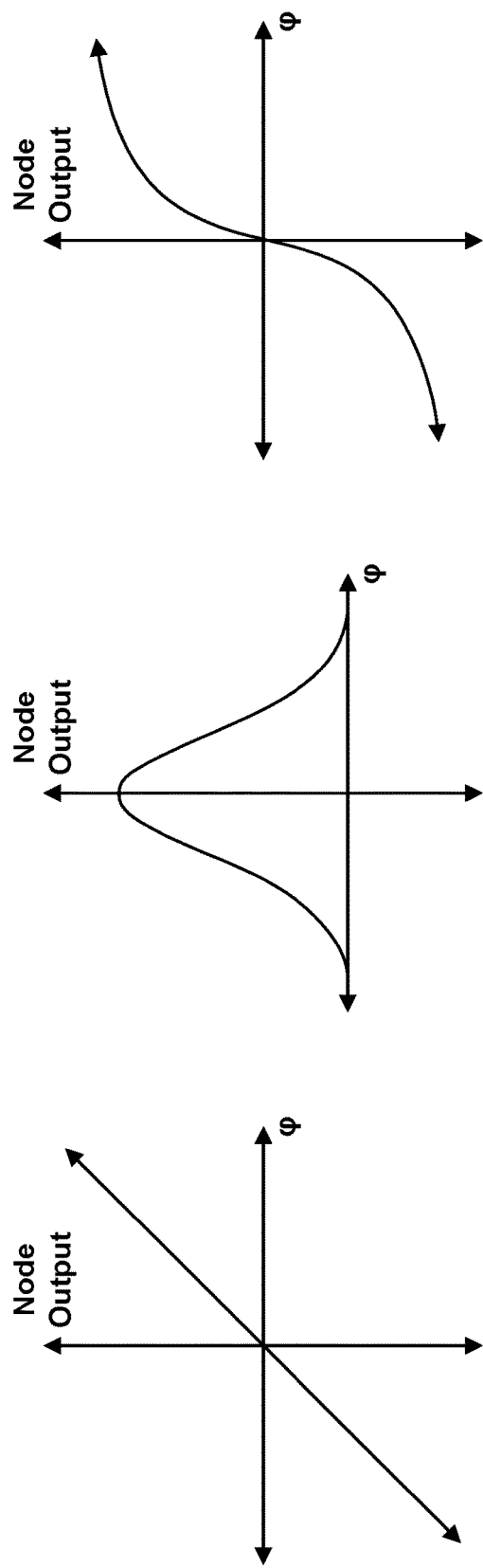
FIG. 5A
FIG. 5B
FIG. 5C
FIG. 5D

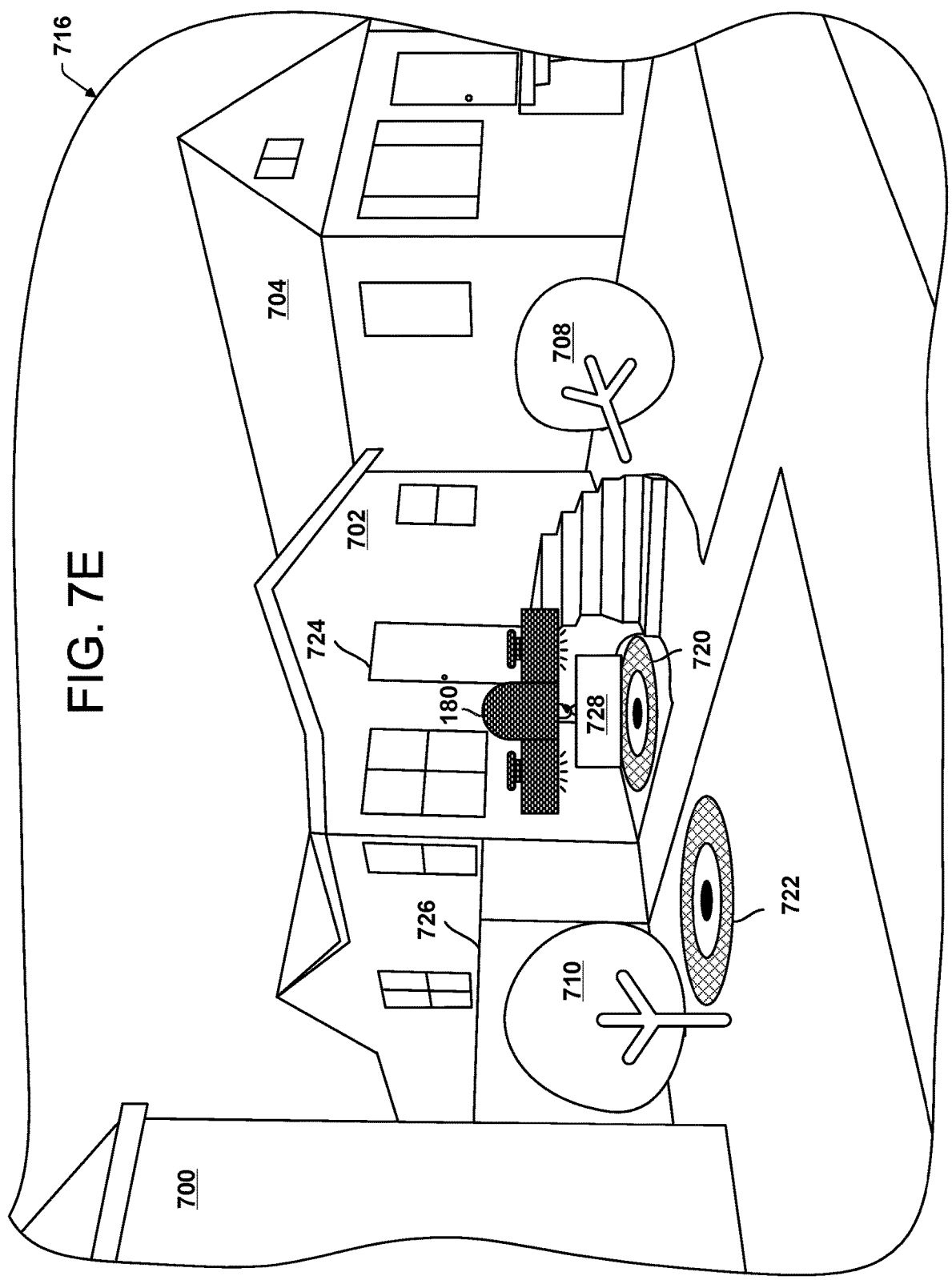

1002

| CLASSIFIED PHYSICAL FEATURES | STRUCTURAL ARRANGEMENT |
|---|---|
| Walkway, Fence, Wall | Backyard Entrance |
| Wall, Door, Stairs | House Entrance |
| Stairs, Wall, Grass | Lawn in front of House |
| Walkway, Stairs | Bottom of Stairs |
| Wall, Wall, Walkway | Corner |
| Wall, Door, Awning | Covered House Entrance |

| Contextual Condition | Backyard Entrance (1004) | House Entrance (1006) | Lawn in front of House (1008) | ... | Covered House Entrance (1014) |
|---|---|---|---|---|---|
| Sunny | 6 | 5 | 5 | | 5 |
| Rainy | 6 | 1 | 1 | | 9 |
| Delivery Before 6PM | 1 | 10 | 1 | | 10 |
| Delivery After 6PM | 10 | 1 | 10 | | 1 |
| High Foot Traffic | 9 | 10 | 2 | | 9 |
| Low Foot Traffic | 4 | 1 | 6 | | 4 |

MODEL FOR DETERMINING DROP-OFF SPOT AT DELIVERY LOCATION

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination thereof. Further, some unmanned vehicles can operate in both a remote-control mode and an autonomous mode, and in some instances may do so concurrently. For instance, a remote pilot or driver may wish to leave navigation to an autonomous system while manually performing another task, such as operating a mechanical system for picking up or dropping off objects, as an example.

Various types of unmanned vehicles exist for different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are possible.

SUMMARY

Example implementations for autonomously determining drop-off spots for object delivery are described herein. The operations may, with little to no human intervention, determine a spot within a larger delivery destination at which an object can be safely and reliably dropped off by an autonomous delivery vehicle. The drop-off spot may be determined by way of one or more machine learning models or algorithms, such as artificial neural networks, to identify a preferred or optimal drop-off spot within a delivery destination. In some embodiments, drop-off spots may alternatively be determined using heuristics models. Further, in some instances, the machine learning and heuristics models may be combined into a hybrid model for determining drop-off spots. The machine learning model may be trained to identify drop-off spots based on a plurality of previously-designated drop-off spots within corresponding delivery destinations. The data associated with the previously-designated drop-off spots may be "mined" or otherwise processed to extract rules and observations that may be used in the process of determining a drop-off spot in a previously unseen delivery destination.

In one example, a system is provided that includes a delivery vehicle, a sensor connected to the delivery vehicle, and a control system. The control system is configured to determine a delivery destination for an object to be delivered by the delivery vehicle. The control system is also configured to receive, from the sensor, sensor data representing a physical environment of at least a portion of the delivery destination. The control system is additionally configured to determine a drop-off spot for the object within the delivery destination by way of an artificial neural network (ANN). The ANN is trained to determine the drop-off spot based on a plurality of previously-designated drop-off spots within a plurality of corresponding delivery destinations. The ANN includes (i) an input node configured to receive as input the sensor data, (ii) a plurality of hidden nodes connected to the input node, and (iii) an output node connected to one or more of the plurality of hidden nodes and configured to provide data indicative of a location of the drop-off spot within the delivery destination. The control system is further configured to provide instructions to cause the delivery vehicle to move to the drop-off spot and place the object at the drop-off spot.

In another example, a method is provided that includes determining a delivery destination for an object to be delivered by a delivery vehicle. The method also includes receiving, from a sensor connected to the delivery vehicle, sensor data representing a physical environment of at least a portion of the delivery destination. The method additionally includes determining a drop-off spot for the object within the delivery destination by way of an artificial neural network (ANN). The ANN is trained to determine the drop-off spot based on a plurality of previously-designated drop-off spots within a plurality of corresponding delivery destinations. The ANN includes (i) an input node configured to receive as input the sensor data, (ii) a plurality of hidden nodes connected to the input node, and (iii) an output node connected to one or more of the plurality of hidden nodes and configured to provide data indicative of a location of the drop-off spot within the delivery destination. The method further includes providing instructions to cause the delivery vehicle to move to the drop-off spot and place the object at the drop-off spot.

In a further example, a non-transitory computer readable storage medium is provided having stored thereon instructions that, when executed by a computing device, cause the computing device to perform operations. The operations include determining a delivery destination for an object to be delivered by a delivery vehicle. The operations also include receiving, from a sensor connected to the delivery vehicle, sensor data representing a physical environment of at least a portion of the delivery destination. The method additionally includes determining a drop-off spot for the object within the delivery destination by way of an artificial neural network (ANN). The ANN is trained to determine the drop-off spot based on a plurality of previously-designated drop-off spots within a plurality of corresponding delivery destinations. The ANN includes (i) an input node configured to receive as input the sensor data, (ii) a plurality of hidden nodes connected to the input node, and (iii) an output node connected to one or more of the plurality of hidden nodes and configured to provide data indicative of a location of the drop-off spot within the delivery destination. The method further includes providing instructions to cause the delivery vehicle to move to the drop-off spot and place the object at the drop-off spot.

In a yet further example, a system is provided that includes means for determining a delivery destination for an object to be delivered by a delivery vehicle. The system also includes means for receiving, from a sensor connected to the delivery vehicle, sensor data representing a physical environment of at least a portion of the delivery destination. The system additionally includes means for determining a drop-off spot for the object within the delivery destination by way of an artificial neural network (ANN). The ANN is trained to determine the drop-off spot based on a plurality of previously-designated drop-off spots within a plurality of corresponding delivery destinations. The ANN includes (i) an input node configured to receive as input the sensor data, (ii) a plurality of hidden nodes connected to the input node, and (iii) an output node connected to one or more of the plurality of hidden nodes and configured to provide data indicative of a location of the drop-off spot within the delivery destination. The system further includes means for providing instructions to cause the delivery vehicle to move to the drop-off spot and place the object at the drop-off spot.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 5A illustrates a structure of a node of an artificial neural network, according to an example embodiments.

FIGS. 5B, 5C, and 5D illustrate activation functions, according to an example embodiment.

FIG. 7E illustrates object delivery, according to an example embodiment.

FIG. 10B illustrates structural arrangements, according to an example embodiment.

FIG. 10C illustrates example drop-off spot scores, according to an example embodiment.

DETAILED DESCRIPTION

Figure 1:
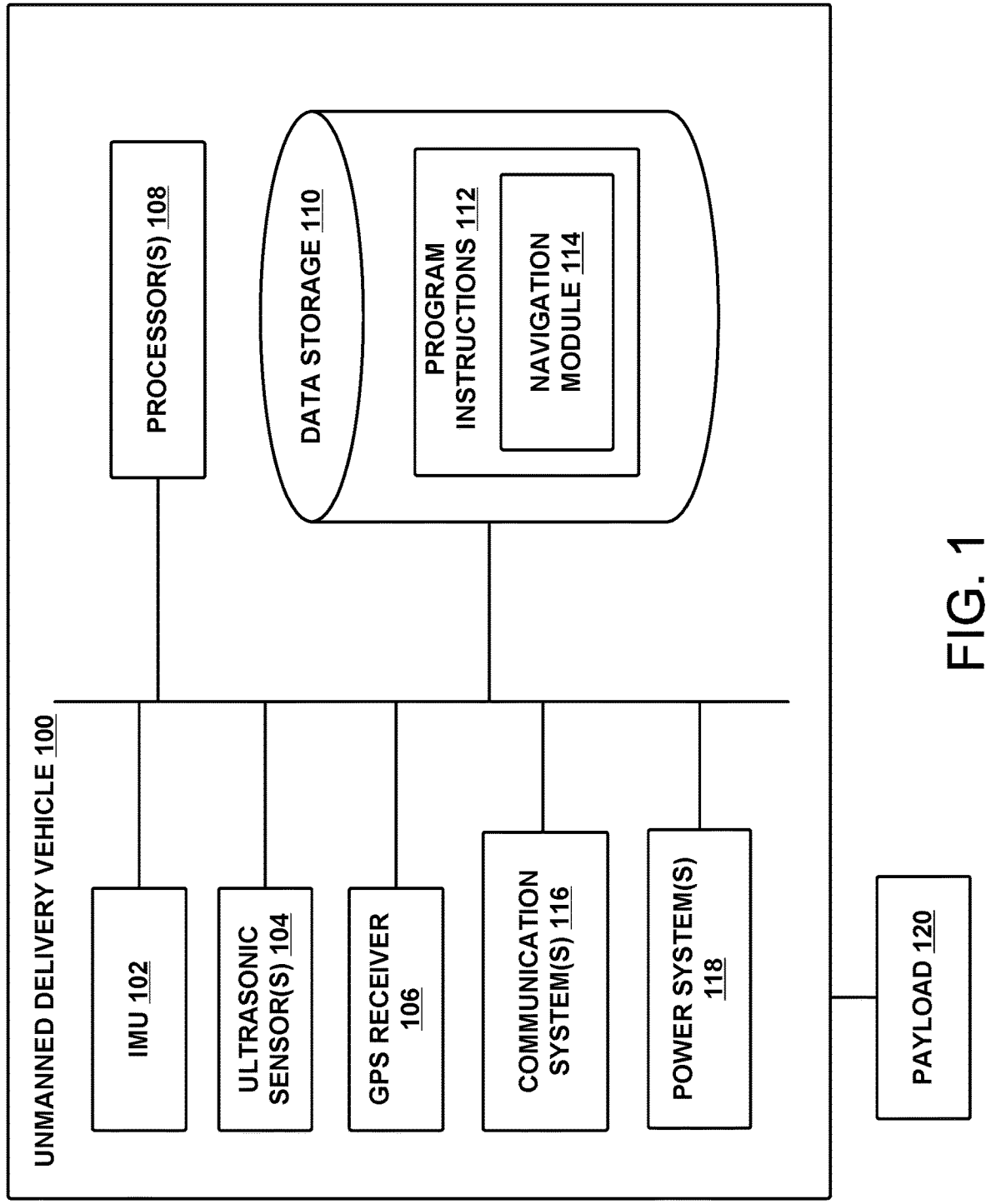
FIG. 1 illustrates a block diagram of components of an unmanned delivery vehicle, according to an example embodiment.

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. OVERVIEW

Package delivery services currently rely on human delivery people to use their judgment and intuition in finding a delivery destination (e.g., home or work address) and selecting a spot at the delivery destination in which to place a package upon delivery (e.g., front porch, side door, etc.). As package delivery services begin to employ unmanned delivery vehicles, package recipients may have more control over when packages are delivered, the delivery destination to which packages are delivered, as well as the spot at which packages are placed upon delivery. For example, in addition to the existing paradigm of delivery to home or work, unmanned delivery vehicles may be scheduled to deliver packages to locations other than a recipient's home (e.g., current user location such as a cafe, restaurant, gym, etc.) at precise, user-specified times. Additionally, recipients may be able to designate a precise target drop-off spot for a package with the aid of a computing device. For instance, recipients may specify spots where the package will not be at risk of theft and will not block doors or walkways.

However, repeatedly specifying target drop-off spots for packages and other objects may become tiresome, resulting in package recipients failing to specify drop-off spots or reusing old drop-off spots. However, the environment and physical features of the delivery destination may change over time, resulting in the old drop-off spots becoming obstructed or unreachable. In some instances, the environment of the delivery destination may change frequently enough such that even newly-designated drop-off spots become inaccessible. For example, more packages may be delivered within a given time window than the number of specified drop-off spots. Thus, a delivery system may need to be capable of determining alternative drop-off spots at which objects may be placed at delivery destinations.

Accordingly, described herein is a system for autonomously determining drop-off spots within a delivery destination. The system may determine drop-off spots by way of an artificial neural network (ANN) or other machine learning model. The ANN may be trained to determine drop-off spots based on a plurality of previously-designated drop-off spots within a plurality of corresponding delivery destinations. The previously-designated drop-off spots may be drop-off spots selected at an earlier time by human users and operators within the delivery system. Training the ANN based on such previous human input allows the ANN to autonomously determine drop-off spots that human users would have been likely to select themselves.

Each respective previously-designated drop-off spot of the plurality of previously-designated drop-off spots may be associated with additional data used in the training of the ANN. For example, the additional data may include a size of a respective object delivered to the respective previously-designated drop-off spot, area/volume occupied by the respective object at the respective previously-designated drop-off spot, physical capabilities of the delivery vehicle delivering the respective object, weather conditions at the time of delivery, crime statistics of the neighborhood, etc.

The trained ANN may accept as input sensor data or a virtual model representing a delivery destination along with any available additional data. Based on the input, the ANN may determine a drop-off spot within the delivery destination. An output of the ANN may include data indicative of a location of one or more drop-off spots within the delivery destination. For example, the data may include coordinates of the drop-off spot within the virtual model representing the delivery destination. Each of the one or more drop-off spots may be associated with a confidence level based on which a final drop-off spot may be selected for the object to be delivered.

The trained ANN may, by virtue of training on the plurality of previously-designated drop-off spots, exhibit an intuitive determination of drop-off spots that parallels the human decision-making process and is thus adaptable to various delivery destinations, including delivery destinations that the ANN has not previously encountered or trained on. Further, by systematically considering additional data that a human delivery person might not consider, the ANN may be capable of systematically (and perhaps with higher success rates than a human) selecting drop-off spots that object recipients are likely to be satisfied with.

In some embodiments, a drop-off spot may alternatively be determined using a heuristics model. For example, after determining a virtual model of a delivery destination based on sensor data, physical features within the delivery destination may be classified according to a plurality of pre-defined categories. The physical features may be classified using, for example, computer vision algorithms based on size, shape, color, etc. The classified physical features may be combined into more complex structural arrangements using a heuristics model. For example, a combination of stairs, a wall, and a door may indicate an entrance to a house.

A drop-off spot score may be determined for each of the structural arrangements within a delivery destination. The score may be conditioned upon the additional data described above to reflect the circumstances in which the package is delivered and any preferences of the package recipient. For example, a structural arrangement offering protection from the rain may be associated with a higher drop-off spot score when the weather is expected to be rainy than when the weather is expected to be sunny. The drop-off spot score of each respective structural arrangement may be used to select a drop-off spot that is likely to be preferred or optimal given the circumstances in which the object is being delivered.

In some embodiments, aspects of the machine learning model for determining drop-off spots may be combined with aspects of the heuristics model to form a hybrid model. For example, the hybrid model may utilize a machine learning approach to classifying the physical features within the delivery destination. The structural arrangements may be determined using the heuristics model. The drop-off spot scores for each of the structural arrangements may be determined or encoded by a machine learning model such as the ANN. Thus, the drop-off spot scores may be dynamically updated or adjusted by retraining the ANN as additional training data becomes available.

II. EXAMPLE UNMANNED DELIVERY VEHICLE SYSTEM

Herein, the terms "unmanned delivery vehicle" and "UDV" refer to any autonomous or semi-autonomous vehicle that is capable of performing some functions without a physically present human pilot. A UDV may be used to deliver objects (e.g., packaged goods) and may thus be configured for pick-up, transportation, and drop-off of objects. However, a UDV may also be capable of performing operations independent of object delivery. A UDV can take various forms. For example, a UDV may be a ground vehicle, an aerial vehicle, a water vehicle, or a multi-terrain hybrid.

FIG. 1 is a simplified block diagram illustrating components of a unmanned delivery vehicle 100, according to an example embodiment. UDV 100 may include various types of sensors, and may include a computing system configured to provide the functionality described herein. In the illustrated embodiment, the sensors of UDV 100 include an inertial measurement unit (IMU) 102, ultrasonic sensor(s) 104, and a GPS 106, among other possible sensors and sensing systems.

In the illustrated embodiment, UDV 100 also includes one or more processors 108. A processor 108 may be a general-purpose processor or a special purpose processor (e.g., digital signal processors, application specific integrated circuits, etc.). The one or more processors 108 can be configured to execute computer-readable program instructions 112 that are stored in the data storage 110 and are executable to provide the functionality of a UDV described herein.

The data storage 110 may include or take the form of one or more computer-readable storage media that can be read or accessed by at least one processor 108. The one or more computer-readable storage media can include volatile and/or non-volatile storage components, such as optical, magnetic, organic or other memory or disc storage, which can be integrated in whole or in part with at least one of the one or more processors 108. In some embodiments, the data storage 110 can be implemented using a single physical device (e.g., one optical, magnetic, organic or other memory or disc storage unit), while in other embodiments, the data storage 110 can be implemented using two or more physical devices.

As noted, the data storage 110 can include computer-readable program instructions 112 and perhaps additional data, such as diagnostic data of the UDV 100. As such, the data storage 110 may include program instructions 112 to perform or facilitate some or all of the UDV functionality described herein. For instance, in the illustrated embodiment, program instructions 112 include a navigation module 114.

A. Sensors

In an illustrative embodiment, IMU 102 may include both an accelerometer and a gyroscope, which may be used together to determine an orientation of the UDV 100. In particular, the accelerometer can measure the orientation of the vehicle with respect to earth, while the gyroscope measures the rate of rotation around an axis. IMU 102 may take the form of or include a miniaturized MicroElectroMechanical System (MEMS) or a NanoElectroMechanical System (NEMS). Other types of IMUs may also be utilized.

An IMU 102 may include other sensors, in addition to accelerometers and gyroscopes, which may help to better determine position and/or help to increase autonomy of the UDV 100. Two examples of such sensors are magnetometers and pressure sensors. In some embodiments, a UDV may include a low-power, digital 3-axis magnetometer, which can be used to realize an orientation independent electronic compass for accurate heading information. However, other types of magnetometers may be utilized as well. Other examples are also possible. Further, a UDV may include some or all of the above-described inertia sensors as separate components from an IMU.

An aerial implementation of UDV 100 may also include a pressure sensor or barometer, which can be used to determine the altitude of the UDV 100. Alternatively, other sensors, such as sonic altimeters or radar altimeters, can be used to provide an indication of altitude, which may help to improve the accuracy of and/or prevent drift of an IMU.

In a further aspect, UDV 100 may include one or more sensors that allow the UDV to sense objects in the environment. For instance, in the illustrated embodiment, UDV 100 includes ultrasonic sensor(s) 104. Ultrasonic sensor(s) 104 can determine the distance to an object by generating sound waves and determining the time interval between transmission of the wave and receiving the corresponding echo off an object. A typical application of an ultrasonic sensor for unmanned vehicles is obstacle avoidance and, in the case of aerial vehicles, low-level altitude control. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UDV 100 may also include one or more imaging system(s). For example, one or more still and/or video cameras may be utilized by UDV 100 to capture image data from the UDV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UDV 100 may also include a GPS receiver 106. The GPS receiver 106 may be configured to provide data that is typical of well-known GPS systems, such as the GPS coordinates of the UDV 100. Such GPS data may be utilized by the UDV 100 for various functions. As such, the UDV may use its GPS receiver 106 to help navigate to a delivery destination for an ordered package, as indicated, at least in part, by GPS coordinates provided by a mobile device associated with a user placing the package order. Other examples are also possible.

B. Navigation and Location Determination

The navigation module 114 may provide functionality that allows the UDV 100 to move about its environment and reach a desired location (e.g., a delivery destination). To do so, the navigation module 114 may control the mechanical features of the UDV. For example, in an aerial UDV, navigation module 114 may control the altitude and/or direction of flight by controlling the mechanical features of the UDV that affect flight (e.g., its rudder(s), elevator(s), aileron(s), and/or the speed of its propeller(s)). In a ground UDV, the navigation module may control vehicle speed and direction by controlling the motors that drive the wheels or tracks and the actuators that control the vehicle steering.

In order to navigate the UDV 100 to a desired location, the navigation module 114 may implement various navigation techniques, such as map-based navigation and localization-based navigation, for instance. With map-based navigation, the UDV 100 may be provided with a map of its environment, which may then be used to navigate to a particular location on the map. With localization-based navigation, the UDV 100 may be capable of navigating in an unknown environment using localization. Localization-based navigation may involve the UDV 100 building its own map of its environment and calculating its position within the map and/or the position of objects in the environment. For example, as a UDV 100 moves throughout its environment, the UDV 100 may continuously use localization to update its map of the environment. This continuous mapping process may be referred to as simultaneous localization and mapping (SLAM). Other navigation techniques may also be utilized.

In some embodiments, the navigation module 114 may navigate using a technique that relies on waypoints. In particular, waypoints are sets of coordinates that identify points in physical space. For instance, an air-navigation waypoint may be defined by a certain latitude, longitude, and altitude. Accordingly, navigation module 114 may cause UDV 100 to move from waypoint to waypoint, in order to ultimately travel to a final destination (e.g., a final waypoint in a sequence of waypoints).

In a further aspect, the navigation module 114 and/or other components and systems of the UDV 100 may be configured for "localization" to more precisely navigate to a target spot within a general destination. More specifically, it may be desirable in certain situations for a UDV to be within a threshold distance of the target spot in the general destination (e.g., a target drop-off spot within a delivery destination) where a payload 120 is being delivered by a UDV. To this end, a UDV may use a two-tiered approach in which it uses a more—general location—determination technique to navigate to the general destination (e.g., delivery destination) that is associated with the target spot (e.g., target drop-off spot for an object), and then use a more-refined location-determination technique to identify and/or navigate to the target spot within the general destination.

For example, the UDV 100 may navigate to the general vicinity of a delivery destination where a payload 120 is being delivered using waypoints and/or map-based navigation. The UDV may then switch to a mode in which it utilizes a localization process to locate and travel to a target spot within the delivery destination. For instance, if the UDV 100 is to deliver a payload to a user's home, the UDV 100 may need to be substantially close to the target drop-off spot for the payload in order to avoid delivery of the payload to undesired areas (e.g., onto a roof, into a pool, onto a neighbor's property, etc.). However, a GPS signal may be limited to accurately guiding the UDV 100 to within a threshold distance of the delivery destination (e.g., within a block of the user's home) due to inherent accuracy limits of GPS systems. A more precise location-determination technique may then be used to find the specific target drop-off spot within the general vicinity of the delivery destination.

Various types of location-determination techniques may be used to accomplish localization of the target spot once the UDV 100 has navigated to the general vicinity of the delivery destination. For instance, the UDV 100 may be equipped with one or more sensory systems, such as, for example, ultrasonic sensors 104, infrared sensors (not shown), and/or other sensors, which may provide input that the navigation module 114 utilizes to navigate autonomously or semi-autonomously to the specific target spot.

As another example, once the UDV 100 reaches the general vicinity of the delivery destination (or of a moving subject such as a person or their mobile device), the UDV 100 may switch to a "fly-by-wire" mode where it is controlled, at least in part, by a remote operator, who can navigate the UDV 100 to the target drop-off spot within the delivery destination. To this end, sensory data from the UDV 100 may be sent to the remote operator to assist them in navigating the UDV 100 to the target drop-off spot.

As yet another example, the UDV 100 may include a module that is able to signal to a passer-by for assistance in reaching the specific target delivery location. For example, the UDV 100 may display a visual message requesting such assistance in a graphic display and/or play an audio message or tone through speakers to indicate the need for such assistance, among other possibilities. Such a visual or audio message might indicate that assistance is needed in delivering the UDV 100 to a particular person or a particular destination, and might provide information to assist the passer-by in delivering the UDV 100 to the person or location (e.g., a description or picture of the person or location), among other possibilities. Such a feature can be useful in a scenario in which the UDV is unable to use sensory functions or another location-determination technique to reach the specific target spot within a delivery destination. However, this feature is not limited to such scenarios.

In some embodiments, once the UDV 100 arrives at the general vicinity of a delivery destination, the UDV 100 may utilize a beacon from a user's remote device (e.g., the user's mobile phone) to locate the person. Such a beacon may take various forms. As an example, consider the scenario where a remote device, such as the mobile phone of a person who requested a UDV delivery, is able to send out directional signals (e.g., via an RF signal, a light signal and/or an audio signal). In this scenario, the UDV 100 may be configured to navigate by "sourcing" such directional signals—in other words, by determining where the signal is strongest and navigating accordingly. As another example, a mobile device can emit a frequency, either in the human range or outside the human range, and the UDV 100 can listen for that frequency and navigate accordingly. As a related example, if the UDV 100 is listening for spoken commands, then the UDV 100 could utilize spoken statements, such as "I'm over here!" to source the specific location of the person requesting delivery of a payload.

In an alternative arrangement, a navigation module may be implemented at a remote computing device, which communicates wirelessly with the UDV 100. The remote computing device may receive data indicating the operational state of the UDV 100, sensor data from the UDV 100 that allows it to assess the environmental conditions being experienced by the UDV 100, and/or location information for the UDV 100. Provided with such information, the remote computing device may determine altitudinal and/or directional adjustments that should be made by the UDV 100 and/or may determine how the UDV 100 should adjust its mechanical features (e.g., its wheel(s), track(s), leg(s), rudder(s), elevator(s), aileron(s), and/or the speed of its propeller(s)) in order to effectuate such movements. The remote computing system may then communicate such adjustments to the UDV 100 so it can move in the determined manner.

C. Communication System

In a further aspect, the UDV 100 includes one or more communication systems 116. The communications systems 116 may include one or more wireless interfaces and/or one or more wireline interfaces, which allow the UDV 100 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UDV 100 may include communication systems 116 that allow for both short-range communication and long-range communication. For example, the UDV 100 may be configured for short-range communications using Bluetooth and for long-range communications under a CDMA protocol. In such an embodiment, the UDV 100 may be configured to function as a "hotspot," or in other words, as a gateway or proxy between a remote support device and one or more data networks, such as a cellular network and/or the Internet. Configured as such, the UDV 100 may facilitate data communications that the remote support device would otherwise be unable to perform by itself.

For example, the UDV 100 may provide a WiFi connection to a remote device, and serve as a proxy or gateway to a cellular service provider's data network, which the UDV might connect to under an LTE or a 3G protocol, for instance. The UDV 100 could also serve as a proxy or gateway to a high-altitude balloon network, a satellite network, or a combination of these networks, among others, which a remote device might not be able to otherwise access.

D. Power Systems

In a further aspect, the UDV 100 may include power system(s) 118. The power system 118 may include one or more batteries for providing power to the UDV 100. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

The UDV 100 may employ various systems and configurations in order to transport a payload 120. In some implementations, the payload 120 of a given UDV 100 may include or take the form of a "package" designed to transport various goods to a target delivery location. For example, the UDV 100 can include a compartment, in which an item or items may be transported. Such a package may one or more food items, purchased goods, medical items, or any other object(s) having a size and weight suitable to be transported between two locations by the UDV. In other embodiments, a payload 120 may simply be the one or more items that are being delivered (e.g., without any package housing the items).

In some embodiments, the payload 120 may be attached to the UDV and located substantially outside of the UDV during some or all of a travel path by the UDV. For example, the package may be tethered or otherwise releasably attached below an aerial UDV during flight to a target location. In an embodiment where a package carries goods below the aerial UDV, the package may include various features that protect its contents from the environment, reduce aerodynamic drag on the system, and prevent the contents of the package from shifting during aerial UDV flight.

For instance, when the payload 120 takes the form of a package for transporting items, the package may include an outer shell constructed of water-resistant cardboard, plastic, or any other lightweight and water-resistant material. Further, in order to reduce drag when transported by an aerial UDV, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UDV. This may move some of the frontal area and volume of the package away from the wing(s) of the UDV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UDV and may cause the contents of the package to shift less during flight.

In order to deliver the payload, the aerial UDV may include a retractable delivery system that lowers the payload to the ground while the UDV hovers above. For instance, the UDV may include a tether that is coupled to the payload by a release mechanism. A winch can unwind and wind the tether to lower and raise the release mechanism. The release mechanism can be configured to secure the payload while being lowered from the UDV by the tether and release the payload upon reaching ground level. The release mechanism can then be retracted to the UDV by reeling in the tether using the winch.

In some implementations, the payload 120 may be passively released once it is lowered to the ground. For example, a passive release mechanism may include one or more swing arms adapted to retract into and extend from a housing. An extended swing arm may form a hook on which the payload 120 may be attached. Upon lowering the release mechanism and the payload 120 to the ground via a tether, a gravitational force as well as a downward inertial force on the release mechanism may cause the payload 120 to detach from the hook allowing the release mechanism to be raised upwards toward the aerial UDV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 120 no longer forces the swing arm to extend from the housing. Retracting the swing arm into the housing may reduce the likelihood of the release mechanism snagging the payload 120 or other nearby objects when raising the release mechanism toward the UDV upon delivery of the payload 120.

Active payload release mechanisms are also possible. For example, sensors such as a barometric pressure based altimeter and/or accelerometers may help to detect the position of the release mechanism (and the payload) relative to the ground. Data from the sensors can be communicated back to the aerial UDV and/or a control system over a wireless link and used to help in determining when the release mechanism has reached ground level (e.g., by detecting a measurement with the accelerometer that is characteristic of ground impact). In other examples, the aerial UDV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UDV 100 could include an air-bag drop system or a parachute drop system. Alternatively, a UDV 100 carrying a payload could simply land on the ground at a delivery location. Other examples are also possible.

A ground-based UDV may include an articulated robotic arm that may be used to move the payload out of a storage compartment on the UDV and place the object at a target drop-off spot within the delivery destination.

III. EXAMPLE UDV DEPLOYMENT SYSTEMS

Figure 2:
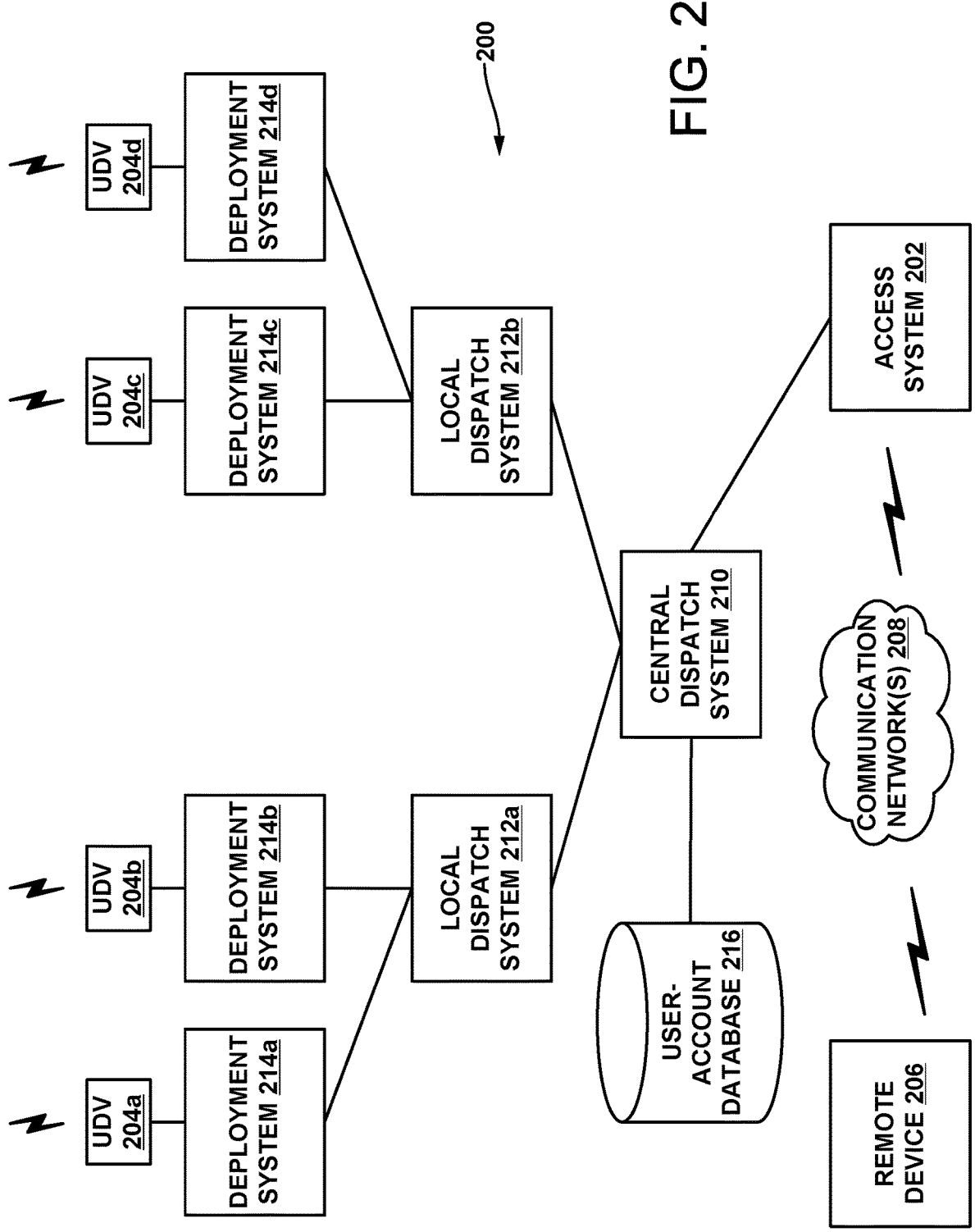
FIG. 2 is a simplified block diagram illustrating an unmanned delivery vehicle system, according to an example embodiment.

UDV systems may be implemented in order to provide various UDV-related services. In particular, UDVs may be provided at a number of different launch sites that may be in communication with regional and/or central control systems. Such a distributed UDV system may allow UDVs to be quickly deployed to provide services across a large geographic area (e.g., that is much larger than the travel range of any single UDV). For example, UDVs capable of carrying payloads may be distributed at a number of launch sites across a large geographic area (possibly even throughout an entire country, or even worldwide), in order to provide on-demand transport of various items to locations throughout the geographic area. FIG. 2 is a simplified block diagram illustrating a distributed UDV system 200, according to an example embodiment.

In the illustrative UDV system 200, an access system 202 may allow for interaction with, control of, and/or utilization of a network of UDVs 204a-204d (i.e., UDVs 204a, 204b, 204c, and 204d). In some embodiments, an access system 202 may be a computing system that allows for human-controlled dispatch of UDVs 204a-204d. As such, the control system may include or otherwise provide a user interface through which a user can access and/or control the UDVs 204a-204d.

In some embodiments, dispatch of the UDVs 204a-204d may additionally or alternatively be accomplished via one or more automated processes. For instance, the access system 202 may dispatch one of the UDVs 204a-204d to transport a payload to a target location, and the UDV may autonomously navigate to the target location by utilizing various on-board sensors, such as a GPS receiver and/or other various navigational sensors.

Further, the access system 202 may provide for remote operation of a UDV. For instance, the access system 202 may allow an operator to control the flight of a UDV via its user interface. As a specific example, an operator may use the access system 202 to dispatch one of UDVs 204a-204d to a delivery destination. The dispatched UDV may then autonomously navigate to the general vicinity of the delivery destination. At this point, the operator may use the access system 202 to take control of the dispatched UDV and navigate the dispatched UDV to a target spot within the delivery destination (e.g., a user-designated target drop-off spot for an ordered package). Other examples of remote operation of a UDV are also possible.

In an illustrative embodiment, the UDVs 204a-204d may take various forms. For example, each of the UDVs 204a-204d may be a UDV such as that illustrated in FIG. 1.

However, UDV system 200 may also utilize other types of UDVs without departing from the scope of the invention. In some implementations, all of the UDVs 204a-204d may be of the same or a similar configuration. However, in other implementations, the UDVs 204a-204d may include a number of different types of UDVs. For instance, the UDVs 204a-204d may include a number of types of UDVs (e.g., ground UDVs, aerial UDVs, and water-based UDVs), with each type of UDV being configured for a different type or types of payload delivery capabilities.

The UDV system 200 may further include a remote device 206, which may take various forms. Generally, the remote device 206 may be any device through which a direct or indirect request to dispatch a UDV can be made. (Note that an indirect request may involve any communication that may be responded to by dispatching a UDV, such as requesting a package delivery). In an example embodiment, the remote device 206 may be a mobile phone, tablet computer, laptop computer, personal computer, or any network-connected computing device. Further, in some instances, the remote device 206 may not be a computing device. As an example, a standard telephone, which allows for communication via plain old telephone service (POTS), may serve as the remote device 206. Other types of remote devices are also possible.

Further, the remote device 206 may be configured to communicate with access system 202 via one or more types of communication network(s) 208. For example, the remote device 206 may communicate with the access system 202 (or a human operator of the access system 202) by communicating over a POTS network, a cellular network, and/or a data network such as the Internet. Other types of networks may also be utilized.

In some embodiments, the remote device 206 may be configured to allow a user to request delivery of one or more items to a desired location. For example, a user could request UDV delivery of a package to their home via their mobile phone, tablet, or laptop. As another example, a user could request dynamic delivery to wherever they are located at the time of delivery. To provide such dynamic delivery, the UDV system 200 may receive location information (e.g., GPS coordinates, etc.) from the user's mobile phone, or any other device on the user's person, such that a UDV can navigate to the user's location (as indicated by their mobile phone).

In an illustrative arrangement, the central dispatch system 210 may be a server or group of servers, which is configured to receive dispatch messages requests and/or dispatch instructions from the access system 202. Such dispatch messages may request or instruct the central dispatch system 210 to coordinate the deployment of UDVs to various target locations. The central dispatch system 210 may be further configured to route such requests or instructions to one or more local dispatch systems 212a and 212b. To provide such functionality, the central dispatch system 210 may communicate with the access system 202 via a data network, such as the Internet or a private network that is established for communications between access systems and automated dispatch systems.

In the illustrated configuration, the central dispatch system 210 may be configured to coordinate the dispatch of UDVs 204a-2014d from a number of different local dispatch systems 212a and 212b. As such, the central dispatch system 210 may keep track of which of UDVs 204a-204d are located at which local dispatch systems 212a and 212b, which of UDVs 204a-204d are currently available for deployment, and/or which services or operations each of the UDVs 204a-204d is configured for (in the event that a UDV fleet includes multiple types of UDVs configured for different services and/or operations). Additionally or alternatively, each of local dispatch systems 212a and 212b may be configured to track which of its associated UDVs 204a-204d are currently available for deployment and/or are currently in the midst of item transport.

In some cases, when the central dispatch system 210 receives a request for UDV-related service (e.g., transport of an item) from the access system 202, the central dispatch system 210 may select a specific one of UDVs 204a-204d to dispatch. The central dispatch system 210 may accordingly instruct the local dispatch system 212a or 212b that is associated with the selected UDV to dispatch the selected UDV. The local dispatch system may then operate its associated deployment system 214a, 214b, 214c, or 214d to launch the selected UDV. In other cases, the central dispatch system 210 may forward a request for a UDV-related service to a local dispatch system 212a or 212b that is near the location where the support is requested and leave the selection of a particular one of UDVs 204a-204b to the local dispatch system 212a or 212b.

In an example configuration, the local dispatch systems 212a and 212b may be implemented as computing systems at the same locations as the respective deployment systems 214a-214d that they control. For example, the local dispatch system 212a may be implemented by a computing system installed at a building, such as a warehouse, where the deployment systems 214a and 214b and UDVs 204a and 204b are also located. In other embodiments, the local dispatch system 212a may be implemented at a location that is remote to its associated deployment systems 214a and 214b and UDVs 204a and 204b.

Numerous variations on and alternatives to the illustrated configuration of the UDV system 200 are possible. For example, in some embodiments, a user of the remote device 206 could request delivery of a package directly from the central dispatch system 210. To do so, an application may be implemented on the remote device 206 that allows the user to provide information regarding a requested delivery, and generate and send a data message to request that the UDV system 200 provide the delivery. In such an embodiment, the central dispatch system 210 may include automated functionality to handle requests that are generated by such an application, evaluate such requests, and, if appropriate, coordinate with an appropriate local dispatch system 212a or 212b to deploy a UDV.

Further, some or all of the functionality that is attributed herein to the central dispatch system 210, the local dispatch systems 212a and 212b, the access system 202, and/or the deployment systems 214a-214b may be combined in a single system, implemented in a more complex system, and/or redistributed among the central dispatch system 210, the local dispatch systems 212a and 212b, the access system 202, and/or the deployment systems 214a-214d in various ways.

Yet further, while each of local dispatch systems 212a and 212b is shown as being associated with two of deployment systems 214a-214d, a given local dispatch system may alternatively have more or fewer associated deployment systems. Similarly, while the central dispatch system 210 is shown as being in communication with two local dispatch systems 212a and 212b, the central dispatch system 210 may alternatively be in communication with more or fewer local dispatch systems.

In a further aspect, the deployment systems 214a-214d may take various forms. In general, the deployment systems 214a-214d may take the form of or include systems for physically launching one or more of the UDVs 204s-204d. Such launch systems may include features that provide for an automated UDV launch and/or features that allow for a human-assisted UDV launch. Further, the deployment systems 214a-214d may each be configured to launch one particular UDV, or to launch multiple UDVs.

The deployment systems 214a-214d may further be configured to provide additional functions, including for example, diagnostic-related functions such as verifying system functionality of the UDV, verifying functionality of devices that are housed within a UDV (e.g., a payload delivery apparatus), and/or maintaining devices or other items that are housed in the UDV (e.g., by monitoring a status of a payload such as its temperature, weight, etc.).

In some embodiments, the deployment systems 214a-214d and their corresponding UDVs 204a-204d (and possibly associated local dispatch systems 212a and 212b) may be strategically distributed throughout an area such as a city. For example, the deployment systems 214a-214d may be strategically distributed such that each deployment system is proximate to one or more payload pickup locations (e.g., near a restaurant, store, or warehouse). However, the deployment systems 214a-214d (and possibly the local dispatch systems 212a and 212b) may be distributed in other ways, depending upon the particular implementation. As an additional example, kiosks that allow users to transport packages via UDVs may be installed in various locations. Such kiosks may include UDV launch systems, and may allow a user to provide their package for loading onto a UDV and pay for UDV shipping services, among other possibilities. Other examples are also possible.

In addition to the various elements discussed above, UDV system 200 may place interveners (not shown) (e.g., people, robotic devices) that may repair or recover delivery vehicles experiencing a failure. Reset tasks may be generated for a marketplace that incentivizes interveners to go to places where assistance is needed to restart or recover downed delivery vehicles experiencing a failure. Different tasks may be assigned to particular interveners based on intervener qualification levels.

In some examples, UDV system 200 may operate according to a hybrid delivery model that may simultaneously plan to complete deliveries using human deliverers and delivery vehicles. For instance, the human deliverers may serve a dual role of delivering packages and being well-positioned to assist vehicles (e.g., restart a downed vehicle, extract a vehicle stuck in a tree). For instance, to deliver to a grid covering an entire neighborhood, delivery vehicles may be interleaved to focus on small sections of the grid at a time. A human deliverer may be placed at or near a center of a group of vehicles to provide quick assistance when needed. Deliveries may be planned to move the delivery vehicles and the human deliverer through the grid simultaneously, thus keeping the human deliverer at or near the center of the group. In another example, a grid of area may be divided into long slices for each delivery vehicle rather than separate quadrants. The delivery vehicles and the human delivered may then all progress in the same direction so that the human deliverer or another intervener can easily be positioned to assist any failing vehicle in the group. Other example configurations involving delivery vehicles and humans synchronized to complete deliveries may exist.

In a further example, deployment system 214a-214d may include deployment trucks or vans configured to transport UDVs (i.e., delivery vehicles) 204a-204d and objects for delivery by UDVs 204a-204d. The deployment truck may be configured to travel along a delivery path or route and dispatch UDVs to deliver objects to delivery destinations along the delivery route. Accordingly, deployment truck may include one or more elements (e.g., sensors, communication systems) configured to oversee the corresponding UDVs. The corresponding UDVs may be operated remotely by a device or control system associated with the deployment truck that deployed the UDVs. This way, the UDVs can include some delivery vehicles that do not require full sensing and planning systems to complete tasks (e.g., object pick-up or drop-off). Rather, such delivery vehicles may perform operations according to plans provided remotely by a system or operator positioned at the deployment truck or another location, resulting in a more cost-effective system. For example, a high-bandwidth communication channel or system between UDVs 204a-204d and respective deployment trucks 214a-214d may be leveraged so that only an inexpensive link to each delivery vehicle is needed. In some instances, the deployment truck may also have its own gantry robot to load the delivery vehicle with objects (e.g., packages) before the vehicle is deployed for delivery. Additionally, the deployment truck may launch a single delivery vehicle, multiple delivery vehicles, or different types of delivery vehicles.

In further examples, system 200 may plan routes for a given deployment truck and may optimize the routes based on expected lengths of time for delivery vehicles to deliver a package and return to the deployment truck. For example, the deployment truck may be configured to continually move through an area, dropping off and picking up vehicles as it goes. Such a system may be particularly advantageous when individual delivery vehicles are particularly slow and/or when certain delivery destinations may be difficult to reach. A control system may be responsible for dynamic and simultaneous adjustment of route plans for both the individual delivery vehicles 204a-204d and the respective deployment trucks 214a-214d.

In a further aspect, the UDV system 200 may include or have access to a user-account database 216. The user-account database 216 may include data for a number of user accounts, and which are each associated with one or more person. For a given user account, the user-account database 216 may include data related to or useful in providing UDV-related services. Typically, the user data associated with each user account is optionally provided by an associated user and/or is collected with the associated user's permission.

Further, in some embodiments, a person may be required to register for a user account with the UDV system 200, if they wish to be provided with UDV-related services by the UDVs 204a-204d from UDV system 200. As such, the user-account database 216 may include authorization information for a given user account (e.g., a username and password), and/or other information that may be used to authorize access to a user account.

In some embodiments, a person may associate one or more of their devices with their user account, such that they can access the services of UDV system 200. For example, when a person uses an associated mobile phone to, e.g., place a call to an operator of the access system 202 or send a message requesting a UDV-related service to a dispatch system, the phone may be identified via a unique device identification number, and the call or message may then be attributed to the associated user account. Other examples are also possible.

IV. EXAMPLE OBJECT DELIVERY OPERATIONS

Figure 3:
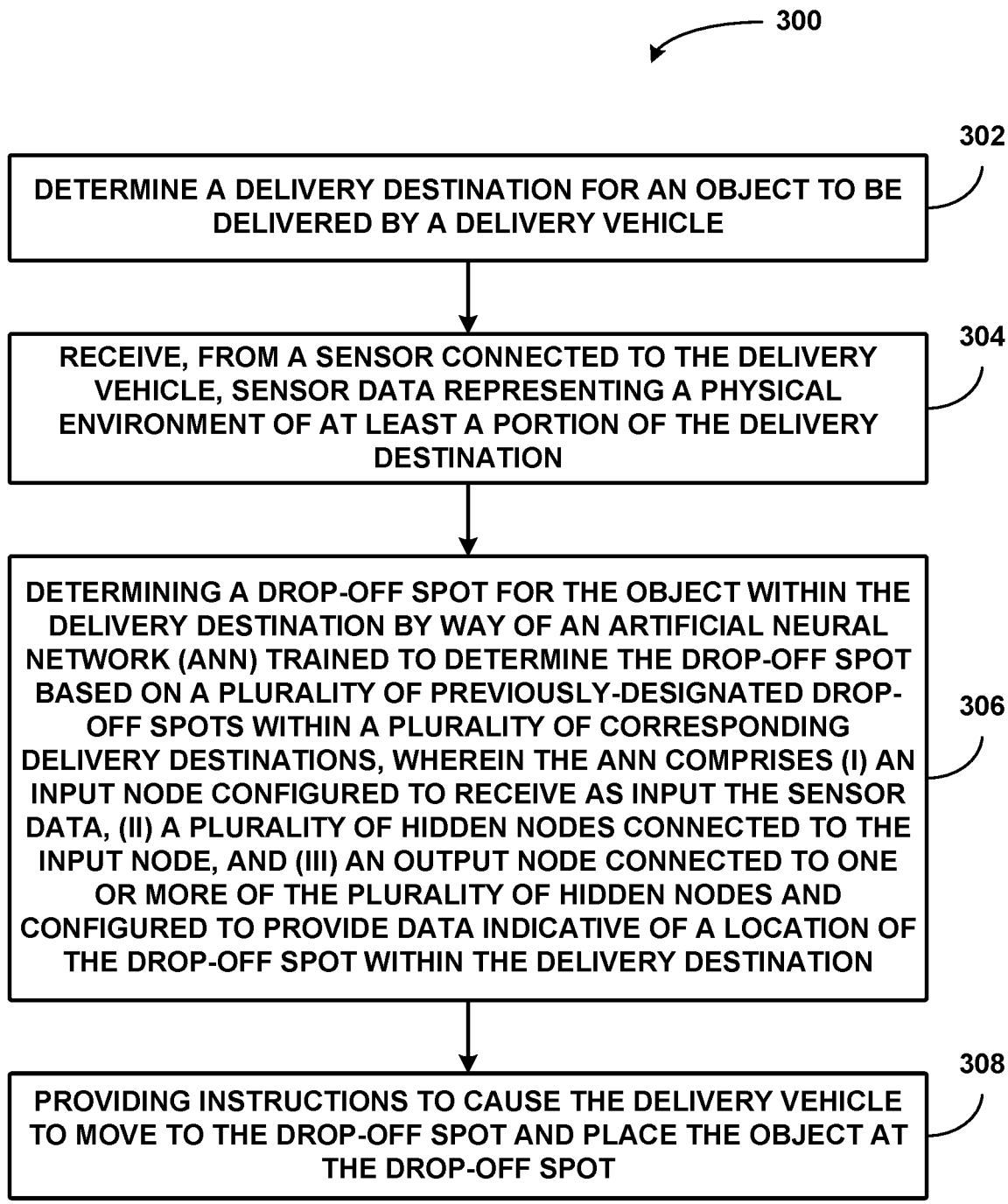
FIG. 3 illustrates a flow diagram, according to an example embodiment.

FIG. 3 illustrates a flow diagram 300 of operations that may be performed by one or more computing devices within a delivery system (e.g., UDV system 200) to deliver an object (e.g., packaged goods) to a drop-off spot within a delivery destination. In one example, the operations of flow diagram 300 may be performed by a server device in communication with a delivery vehicle and a client computing device. Alternatively, a control system of the delivery vehicle (e.g., a processor and memory local to the delivery vehicle) may be configured to perform the operations of flow diagram 300. In some embodiments, the operations of flow diagram 300 may be distributed between one or more server devices, one or more delivery vehicles, and one or more client computing devices associated with a recipient of the object. The manner in which the operations are divided may be based on a communication bandwidth associated with the operations herein described.

Within examples, a delivery destination may be a geographic location to which delivery of an object is requested. The delivery destination may be, for example, a residence of a user requesting delivery of the object. In other examples, the delivery destination may be the user's work, a residence belonging to the user's relatives, a current location of the user, or a future location of the user, among other possibilities. The extent of the delivery location may be defined by, for example, a property line corresponding to the residence or a radial expanse surrounding a Global Positioning System coordinate.

Additionally, within examples, a drop-off spot may be an area within the delivery destination at which a delivery vehicle is to place the object upon delivery of the object to the delivery destination. The area of the drop-off spot may be a subset of the area of the delivery destination. A drop-off spot may be designated by a user or may be autonomously selected by a control system of the delivery vehicle through the operations herein described. In some examples, when the drop-off spot is designated by a user, it may be referred to as a target drop-off spot or a user-designated drop-off spot.

In block 302, a delivery destination may be determined for an object to be delivered by a delivery vehicle. For example, the delivery system may select the next object in a queue of objects scheduled to be delivered and assign a delivery vehicle to deliver the object. The system may determine the delivery destination by referencing a database storing an indication of a location (e.g., address or GPS coordinates) designated by the object recipient as the delivery destination for the object. The delivery vehicle may pick up the object and navigate therewith to within a threshold distance (e.g., within several meters) of the delivery destination based on GPS coordinates of the delivery destination. In order to locate the delivery destination and, more specifically, a drop-off spot at which to place the object within the delivery destination, the delivery vehicle may rely on additional, non-GPS sensor data after coming within the threshold distance of the delivery destination.

Accordingly, in block 304, sensor data representing a physical environment of at least a portion of the delivery destination may be received from a sensor connected to the delivery vehicle. The sensor may include, for example, a camera, a stereo camera, a depth sensor (e.g., a structured light three-dimensional scanner), LIDAR, accelerometers, magnetometers, and gyroscopes, among other possibilities. The sensor data may be used to locate the delivery destination, navigate the delivery vehicle while at the delivery destination, locate a drop-off spot within the delivery destination, and place the object at the drop-off spot.

To that end, in some embodiments, a virtual model of the delivery destination may be determined based on the sensor data. The virtual model may represent physical features of the delivery destination, including topological features, vegetation, buildings, and other objects contained in, adjacent to, or observable from the delivery destination. The virtual model may be a three dimensional (3D) model such as a point cloud, wireframe model, surface model, or solid model. Alternatively, the model may be two dimensional and may include depth information. Further, in some embodiments, the model may be a collection of multiple images representing the delivery destination.

In some embodiments, the sensor data representing the physical environment of at least a portion of the delivery destination may be received from a sensor connected to another vehicle (i.e., a vehicle different from the vehicle delivering the object). For example, the sensor data may be received from a sensor on a vehicle that delivered an object to the delivery destination at an earlier time. Alternatively or additionally, the sensor data may be received from a delivery vehicle that scanned the delivery destination while on route to another delivery destination. Further, the sensor data may be received from sensors on deployment truck 214, as discussed with respect to FIG. 2. Generally, the sensor data may be received from any vehicle or computing device in or communicatively connected to the delivery system. The sensor data may be a live/real-time sensor data stream or it may be sensor data that has been collected at an earlier point in time.

In block 306, a drop-off spot for the object may be determined within the delivery destination by way of an artificial neural network (ANN). The ANN may be trained to determine the drop-off spot based on a plurality of previously-designated drop-off spots within a plurality of corresponding delivery destinations. The ANN may include an input node configured to receive as input the sensor data, a plurality of hidden nodes connected to the input node, and an output node connected to one or more of the plurality of hidden nodes and configured to provide data indicative of a location of the drop-off spot within the delivery destination.

In some example embodiments, the sensor data may be provided to the ANN in the form of the virtual model. Accordingly, the data indicative of the location of the drop-off spot may include coordinates of the drop-off spot within the virtual model. Alternatively, the ANN may be configured to receive as input the raw sensor data. The data indicative of the location of the drop-off spot may include a position relative to one or more physical features within the delivery destination.

The delivery system may be configured to determine the drop-off spot at which to place the object when the recipient of the object has not, prior to delivery of the object, designated a drop-off spot at which they would like the object placed. Alternatively, in some instances, the drop-off spot may be determined when a target drop-off spot for the object, designated by the recipient prior to delivery of the object, is obstructed by another object (e.g., a branch that has fallen onto the target drop-off spot). Alternatively or additionally, the delivery vehicle might be unable to find a trajectory to the target drop-off spots due to the physical features within the delivery destination (e.g., a ground-based delivery vehicle might be unable to travel over a fence to reach a target drop-off spot in the backyard). Further, in some cases, the delivery system may determine to place the object in a drop-off spot other than the target drop-off spot designated by the recipient for other reasons. For example, the system may determine that the target drop-off spot designated by the recipient is too small to have the object placed therein or that the target drop-off spot is not safe (e.g., easily visible or accessible from a public walkway).

The ANN used to determine the drop-off spot may be trained to determine drop-off spots within delivery destinations based on previously-designated drop-off spots within corresponding delivery destinations. The previously-designated drop-off spots may include, for example, (i) drop-off spots designated by the object recipient for previously-delivered objects, (ii) pick-up spots at which the object recipient has previously placed objects for pick-up by the delivery vehicle, (iii) drop-off spots designated by other recipients of respective objects, (iv) pick-up spots at which other recipients have previously placed respective objects for pick-up by the delivery vehicle, (v) drop-off spots chosen by human pilots during prior deliveries of objects, (vi) drop-off spots chosen autonomously by the delivery system (e.g., using the ANN) during prior deliveries of objects, and (vii) drop-off spots designated by other users by way of a software application configured to present the users with example delivery destinations within which the users may designate preferred drop-off spots. The previously-designated drop-off spots (e.g., (i)-(vii)) may be associated with data representing user satisfaction feedback. The user satisfaction feedback may be used during training to determine the desirability of the respective previously-designated drop-off spots. Other sources of previously-designated drop-off spots may be possible.

In some embodiments, the previously-designated drop-off spots may be associated with additional data indicating the context in which a respective drop-off spot of the previously-designated drop-off spots was selected (e.g., vehicle capabilities, object size, recipient preferences, etc.). The ANN may additionally be trained based on this additional data and may thus consider such additional data when determining a drop-off spot.

When the sensor data is provided as input to the input node, the data may be propagated through the trained ANN (i.e., from the input node, through the hidden nodes, to the output node) to determine a drop-off spot within the delivery destination represented by the sensor data. The sensor data provided as input may be transformed according to interconnections between the nodes of the ANN and their respective weighting values. Thus, the output node of the ANN may provide data indicative of a location of the drop-off spot within the delivery destination.

In block 308, instructions may be provided to cause the delivery vehicle to move to the drop-off spot and place the object at the drop-off spot. The instructions may include, for example, motor commands to cause the delivery vehicle to follow a trajectory to the drop-off spot. Further, additional sensor data may be received while the delivery vehicle follows the trajectory to the drop-off spot. The motor commands may be determined or adjusted based on feedback from the additional sensor data to keep the delivery vehicle on the trajectory to the drop-off spot. The instructions may further include commands to, for example, detach or unload the object from the delivery vehicle once the delivery vehicle is at or near the drop-off spot.

V. EXAMPLE ARTIFICIAL NEURAL NETWORK

Figure 4:
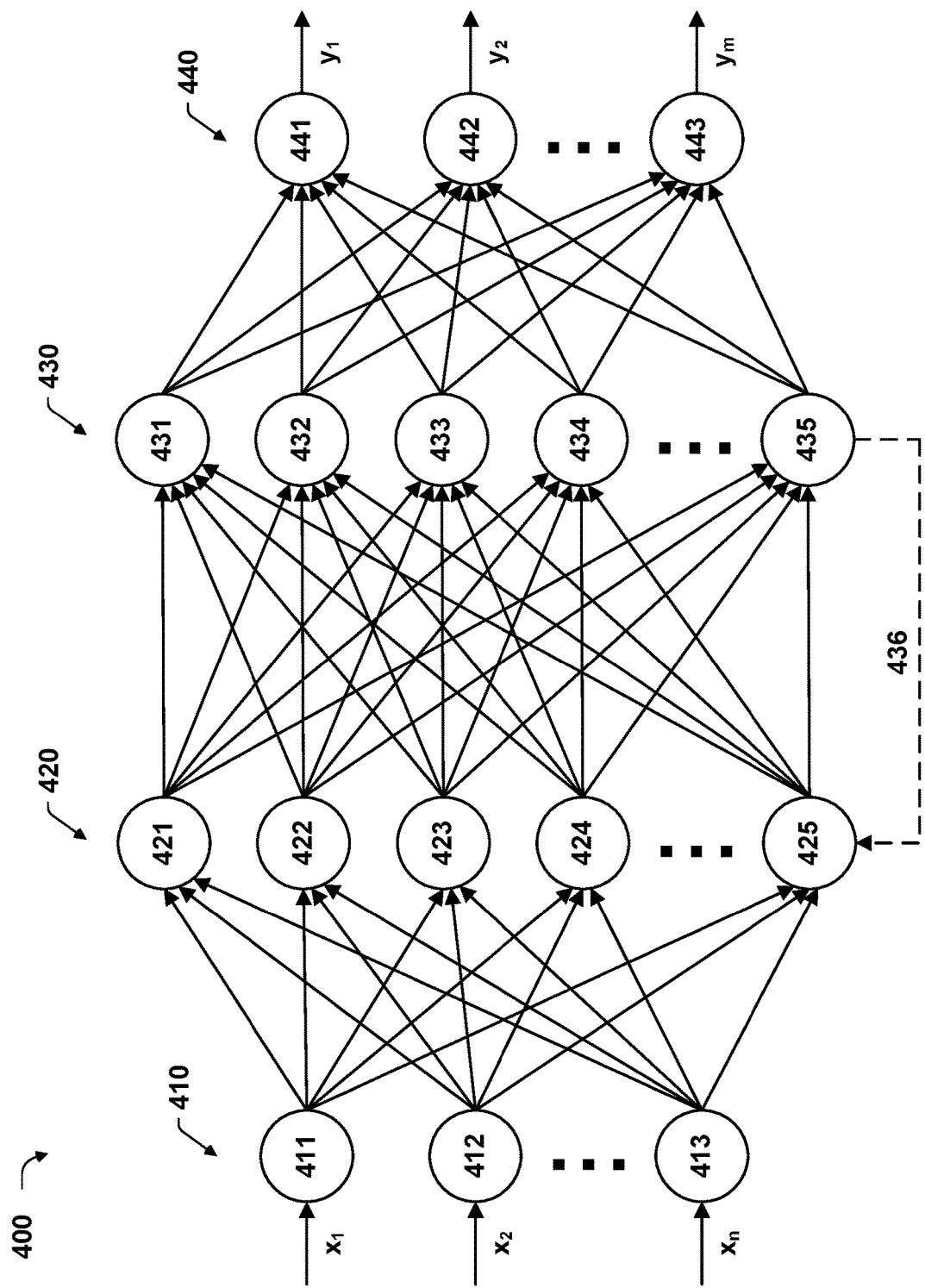
FIG. 4 illustrates an artificial neural network, according to an example embodiment.

FIG. 4 illustrates an example structure of an ANN 400 that may be used to determine the drop-off spot. ANN 400 may include input nodes 411 and 412 through 413 that form part of input layer 410 of ANN 400 and are configured to accept inputs $x_1$ and $x_2$ through $x_n$, respectively. In some embodiments, the number of inputs n may be equal to or greater than the size/dimension of the sensor data. For example, the sensor data may be a red, green, blue, plus depth (RGB-D) image data comprising M columns and N rows of pixels. Each of the M×N pixels may be associated with four different values: a red value, a green value, a blue value, and a depth value. Accordingly, ANN 400 may be configured to take as input n=M× N×4 or more inputs. In another example, the sensor data may be provided to ANN 400 in the form of a 3D virtual model comprising a height M, a width N, and a depth K. Each element (e.g., pixel) of the 3D model may be associated with three different values, a red value, a green value, and a blue value. Accordingly, the ANN 400 may be configured to take as input n=M× N× K×3 or more inputs. In further examples, ANN 400 may accept the sensor data formatted in different ways. In some embodiments, ANN 400 may additionally consider other inputs which are herein discussed and may thus accept more inputs than the size of the sensor data dictates.

ANN 400 may additionally include a plurality of hidden nodes that form part of one or more hidden layers 420 and 430. Hidden nodes 421, 422, 423, and 424 through 425 may form first hidden layer 420 while hidden nodes 431, 432, 433, and 434 through 435 may form second hidden layer 430. In some examples, ANN 400 may include additional hidden nodes and additional hidden layers not shown herein. The number of hidden nodes and hidden layers may be determined empirically during training of ANN 400 to achieve an ANN that determines drop-off spots with a satisfactory accuracy (i.e., an accuracy greater than a threshold accuracy).

Notably, the terms "hidden node" and "hidden layer" are used herein to designate nodes and layers, respectively, located between the input and output layers of the ANN. These and similar terms are not to be construed as implying that values, functions, or other properties associated with the hidden nodes or layers are necessarily unknown or hidden.

ANN 400 may further include output nodes 441 and 442 through 443 that form part of an output layer 440 of ANN 400. Output nodes 441 and 442 through 443 may be configured to provide outputs $y_1$ and $y_2$ through $y_m$, respectively. In some embodiments, the number of outputs m may be equal to or greater than a number of coordinates needed to unambiguously specify the determined drop-off spot. For example, when the input sensor data is an RGB-D image, the number of outputs m may be equal to 3. That is, $y_1$ may specify the horizontal position of the drop-off spot within the RGB-D image, $y_2$ may specify the vertical position of the drop-off spot within the RGB-D image, and $y_3$ may specify the depth of the drop-off spot within the RGB-D image. Similarly, when the input sensor data is a 3D virtual model, $y_1$ may specify the x-position of the drop-off spot within the virtual model, $y_2$ may specify the y-position of the drop-off spot within the virtual model, and $y_3$ may specify the z-position of the drop-off spot within the virtual model. Alternatively, in some embodiments, ANN 400 may map M×N×K 3D coordinates onto a scalar value ranging from 0 to M×N×K (or other value, depending on the number of possible coordinates). Thus, the output of ANN 400 may be a single scalar value that nevertheless unambiguously specifies the determined drop-off spot within the delivery destination. The outputs 441 and 442 through 434 may also provide additional outputs which are herein discussed.

The nodes of ANN 400 may be connected with one another, as illustrated by the arrows in FIG. 4. For example, input nodes 411-413 may be connected to hidden nodes 421-425 of the first hidden layer 420 (i.e., input layer 410 may be connected to hidden layer 420), hidden nodes 421-425 may be connected to hidden nodes 431-435 of the second hidden layer 430 (i.e., hidden layer 420 may be connected to hidden layer 430), and hidden nodes 430-435 may be connected to output nodes 441-443 (i.e., hidden layer 430 may be connected to output layer 440). In some embodiments, each node of a layer may be connected to each node within a subsequent layer (e.g., node 424 may be connected to each of nodes 431-435). Alternatively, some nodes within a layer may be unconnected to one or more nodes within a subsequent layer.

In further embodiments, nodes within a layer may be connected back to nodes within a previous layer or within the same layer. For example, node 435 within layer 430 may be connected to node 425 within prior layer 420 by way of connection 436. In another example, node 435 within layer 430 may be connected to at least one of nodes 431, 432, 433, or 434 within layer 430 (not shown). Thus, ANN 400 may include feedback that creates internal state within the network. This type of ANN may be referred to as a recurrent artificial neural network (RANN). Notably, an ANN without any feedback paths may be referred to as a feedforward artificial neural network (FF-ANN).

FIG. 5A illustrates the structure and connections of an example node 550 of ANN 400. In particular, each connection between nodes of ANN 400 may be associated with a respective weighting value. Each of inputs $a_1$ and $a_2$ through $a_k$ may be associated with corresponding weighting values $w_1$ and $w_2$ through $w_k$, respectively. Node 550 may operate by first taking the sum of the respective products of each input multiplied by the corresponding weighting value, as represented by summing junction 552. Summing junction 552 may compute the sum $\varphi = w_1 a_1 + w_2 a_2 + \ldots + w_k a_k$. The sum $\varphi$ may then be passed through an activation function 554 to produce the output of node 550. Example activation functions are illustrated in FIGS. 5B, 5C, and 5D. FIG. 5B illustrates a linear activation function where the node output is linearly proportional to the sum $\varphi$. FIG. 5C illustrates a Gaussian activation function where the node output is normally distributed along a bell curve according to the sum $\varphi$. FIG. 5D illustrates a sigmoidal activation function where the sum $\varphi$ is mapped to a bounded range of node outputs.

In some embodiments, ANN 400 may be or may include therein aspects of a convolutional artificial neural network (CANN). Accordingly, the activation function 554 may be a rectifier function (i.e., f(x)=max (0, x)). When all nodes within a given layer utilize the rectifier function, the given layer may be said to include a Rectified Linear Units (ReLU) layer. Additionally, pooling layers (i.e., downsampling layers) may be included between layers 410, 420, 430, and 440. Further, when ANN 400 is or includes a CANN, one or more of the hidden nodes may represent feature filters configured to filter the input sensor data for specific features (e.g., vertical lines, horizontal lines, curves, edges, etc.). The filters may become increasingly complex, filtering for higher-order features, as the hidden nodes of the CANN are traversed. Further, ANN 400 may additionally include aspects of probabilistic neural networks, time-delay neural networks, regulatory feedback neural networks, and spiking neural networks, among other types of neural networks not herein discussed.

The output of node 550 may be provided as input to other nodes within ANN 400. At each respective node to which the output of node 550 is connected, the output of node 550 may be multiplied by a corresponding weighting value and summed along with other inputs to the respective node. For example, the output of node 421 may be provided to node 435. The output of node 421 may be multiplied by a weighting value associated with the connection between node 421 and 435. This product may then be summed at node 435 along with the product of the output of node 422 and the weighting value between node 422 and node 435, the product of the output of node 423 and the weighting value between node 423 and node 435, the product of the output of node 424 and the weighting value between node 424 and node 435, and the product of the output of node 425 and the weighting value between node 425 and node 435. The sum may be passed through activation function 554 to determine the output of node 435. The output of node 435 may then be provided to nodes 441 and 442 through 443.

The weighting values between interconnected nodes may be determined by training ANN 400 based on the plurality of previously-designated drop-off spots and any additional data associated therewith. The training of ANN 400 may be performed by, for example, backpropagation (e.g., classical backpropagation, backpropagation with momentum, Gauss-Jacobi backpropagation, Gauss-Seidel backpropagation, etc.).

Generally, ANN 400 may be configured to accept as input and determine drop-off spots based on the type of data with which it is trained. Thus, for example, an ANN trained based on a plurality of previously-designated drop-off spots, each designated within a virtual model and associated with a package size, weather conditions at the time of delivery, and vehicle capabilities of the respective delivery vehicle performing the delivery, may accept as input and determine a drop-off spot within a given delivery destination based on a virtual model of the given delivery destination, a size of the package to be delivered, current weather conditions at the delivery destination, and capabilities of the delivery vehicle performing the delivery.

Notably, the trained ANN 400 may determine candidate drop-off spots within delivery destinations that it has not previously encountered or trained on. The ANN may determine locations of drop-off spots that, based on the training data, are similar to the locations of previously-designated drop-off spots. For example, the ANN may determine locations for the drop-off spot that do not obstruct the entrance to the house, do not obstruct walkways or driveways around the house, are secluded from public spaces to prevent theft, and are large enough to accommodate the object, among other considerations.

Further, by training on a plurality of drop-off spots that have been previously-designated by human users (e.g., recipients of previously-delivered objects), ANN 400 may select drop-off spots that are likely similar to drop-off spots that a human would select. Thus, the delivery system may autonomously select drop-off spots that are likely to be satisfactory to object recipients, without direct involvement of the recipient or other human.

VI. EXAMPLE APPLICATION OF AN ARTIFICIAL NEURAL NETWORK WITHIN A SYSTEM

Figure 6:
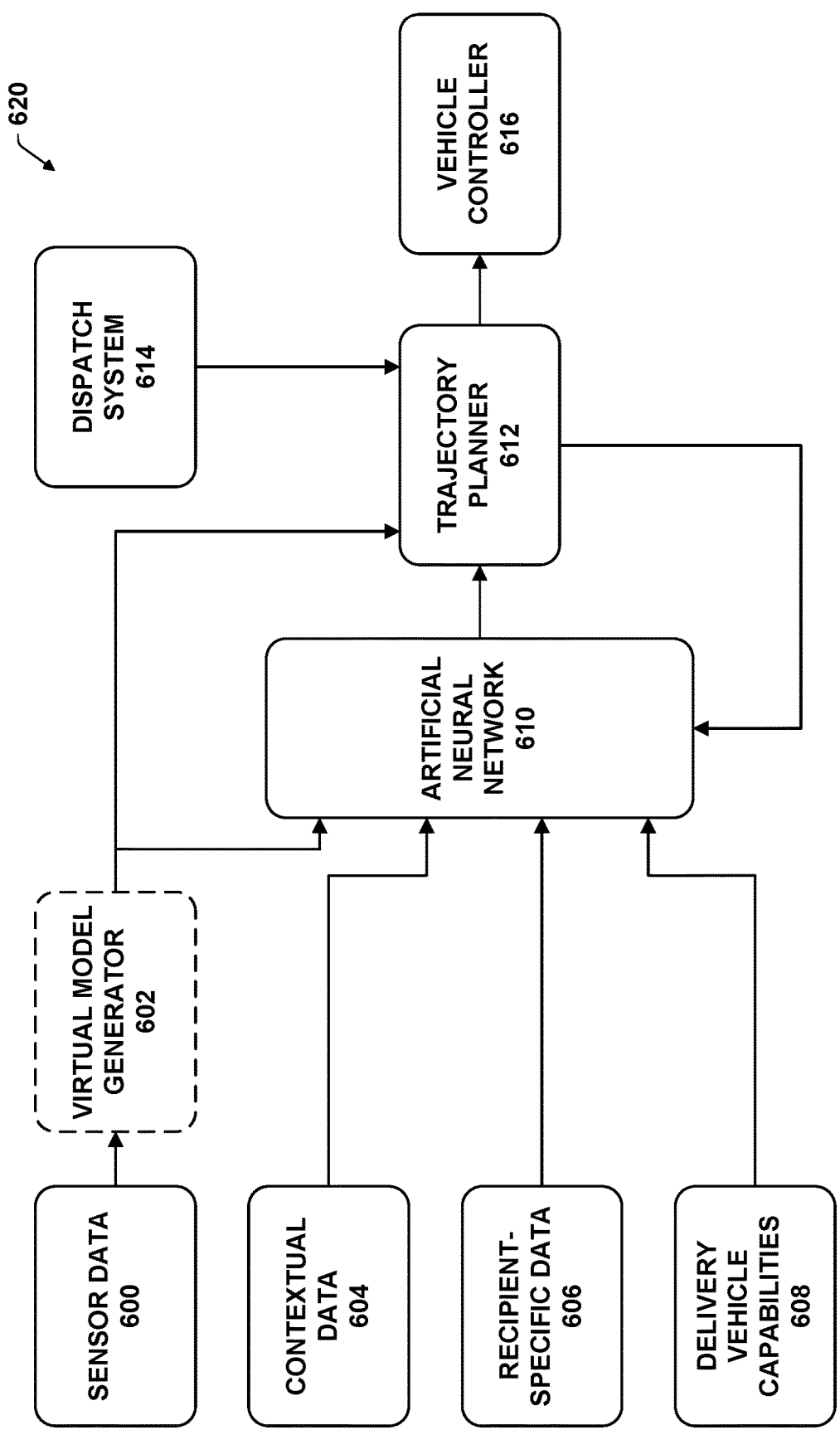
FIG. 6 illustrates a system utilizing an artificial neural network, according to an example embodiment.

FIG. 6 illustrates an example system 620 employing an ANN configured to determine drop-off locations for objects. The components of system 620 may be implemented as software, hardware, or a combination thereof. For example, system 620 may represent software modules within a control system of UDV system 200. Further, the components of system 620 may be distributed between the delivery vehicle and one or more computing devices communicatively connected to the delivery vehicle (e.g., one or more servers within UDV system 200). In some embodiments, the operations described as being performed by a particular component of system 620 may alternatively be performed by one or more other components within system 620 or other components not herein illustrated.

System 620 may include dispatch system 614 configured to schedule delivery of objects, assign delivery vehicles to deliver respective objects, and provide the delivery vehicles with respective delivery destinations for the objects they are to deliver. System 620 may additionally include trajectory planner 612 configured to determine a trajectory for navigating the delivery vehicle to the delivery destination and, while at the delivery destination, determine a trajectory for navigating the delivery vehicle to a drop-off spot within the delivery destination. The trajectories may be determined based on sensor data 600 from sensors on the vehicle. In some embodiments, virtual model generator 602 may generate a virtual model based on sensor data 600 and trajectory planner 612 may use the virtual model in planning trajectories. Vehicle controller 616 may receive as input the trajectories determined by trajectory planner 612 and may control components of the delivery vehicle (e.g., motors or actuators) to cause the delivery vehicle to follow a particular trajectory.

System 620 may further include artificial neural network 610 configured to determine drop-off spots within delivery destinations. ANN 610 may be similar to ANN 400 illustrated in FIG. 4. In some embodiments, ANN 610 may include two or more ANNs, connected serially or in parallel, and each configured to perform a subset of the operations for determining drop-off spots. ANN 610 may determine drop-off spots based on sensor data 600, contextual data 604, recipient-specific data 606, and delivery vehicle capabilities 608.

Contextual data 604, recipient-specific data 606, and delivery vehicle capabilities 608 may represent data stored in a database to which ANN 610 may be communicatively connected and based on which ANN 610 may have been trained. In some embodiments, sensor data 600 may be processed by virtual model generator 602 and then provided to ANN 610 in the form of a virtual model. Additionally, in some embodiments, trajectory planner 612 may provide feedback to ANN 610. For example, trajectory planner 612 may determine when a drop-off spot is occupied or unreachable and may responsively prompt ANN 610 to determine an alternative drop-off spot.

In scheduling the delivery of objects, dispatch system 614 may be configured to determine an amount of time allotted to delivery of an object to a respective delivery destination. The allotted amount of time may be based on a number of objects waiting to be delivered, expected delivery dates associated with the objects, and distances over which the objects have to be delivered, among other factors. Dispatch system 614 may provide to trajectory planner 612 an indication of the object to be delivered, a delivery destination for the object, the allotted time for delivery of the object, and, in some embodiments, a user-selected drop-off spot within the delivery destination at which the object is to be placed. For example, dispatch system 614 may instruct delivery vehicle 180 to deliver an object to residence 702, illustrated in FIG. 7A, by providing GPS coordinates of residence 702 to trajectory planner 612.

Figure 7A:
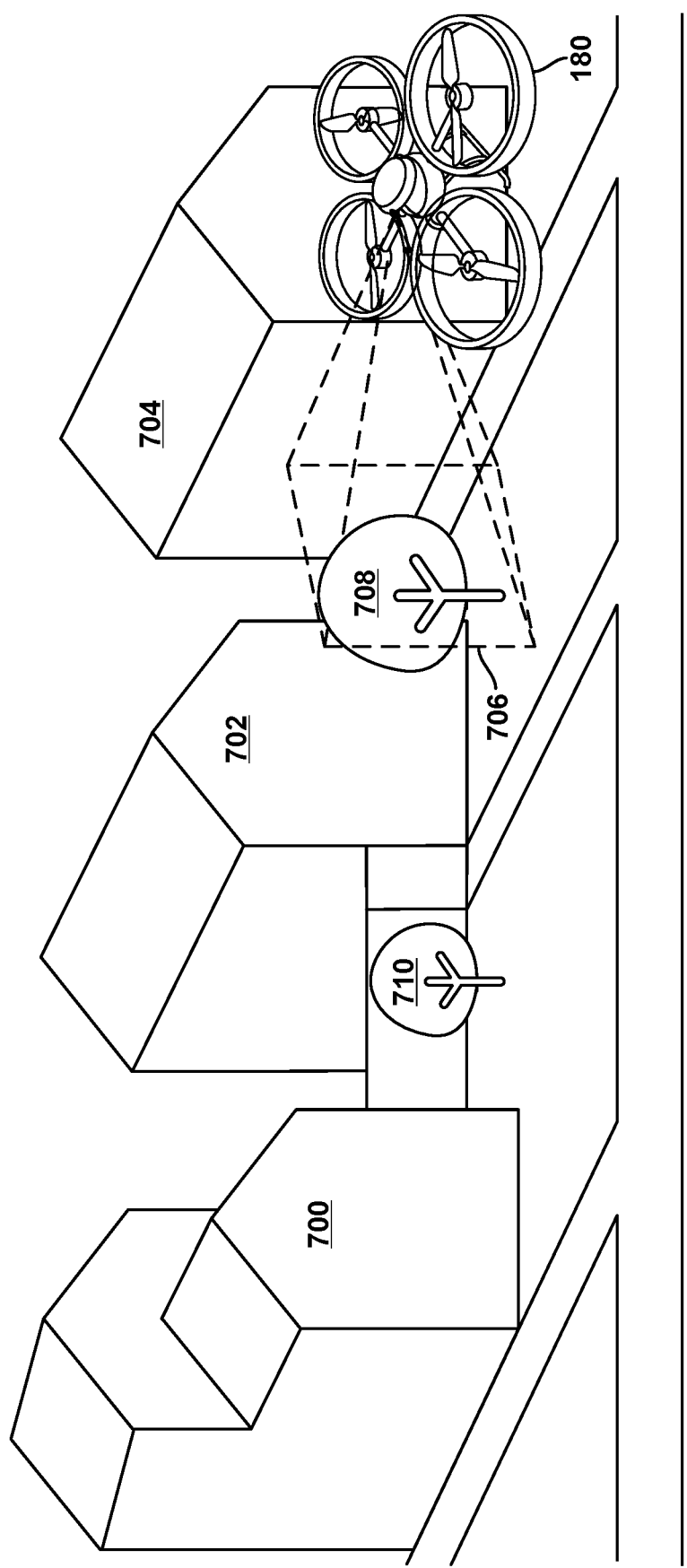
FIG. 7A illustrates a delivery destination, according to an example embodiment.
Figure 7B:
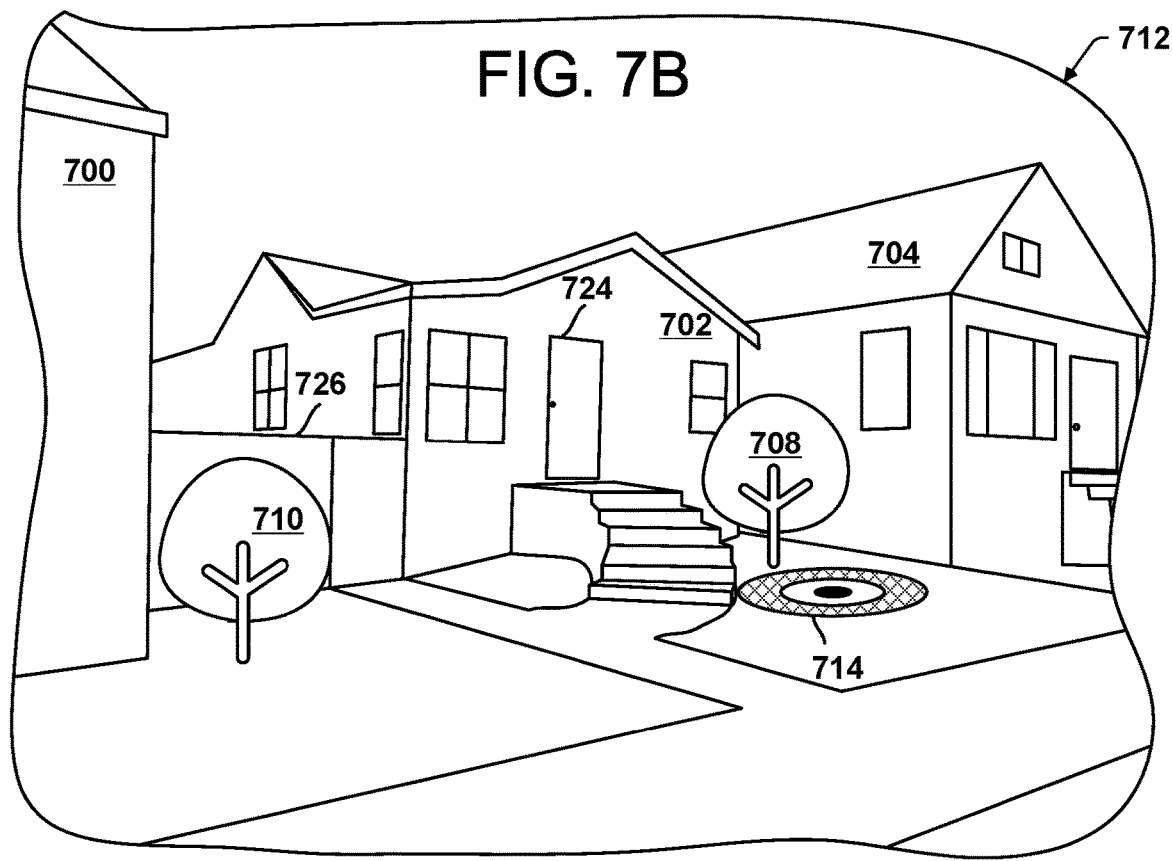
FIGS. 7B and 7C illustrate models of a delivery destination, according to an example embodiment.

In some embodiments, the target drop-off spot may, prior to delivery of the object, be designated by a recipient of the object. For example, as illustrated in FIG. 7B, the recipient may designate target drop-off spot 714 as the drop-off spot at which the recipient would like the object placed upon delivery. Target drop-off spot 714 may be designated within or with the aid of virtual model 712 of delivery destination 702. A computing device within the delivery system (e.g., a server device, the recipient's smartphone) may generate virtual model 712 based on sensor data received from one or more sensors on or connected to a client computing device. For example, the recipient may capture a plurality of images of delivery destination 702 using a camera on the client computing device. In some embodiments, each image may be associated with additional sensor data from one or more additional sensors on the client computing device such as, for example, GPS module, magnetometers, gyroscopes, and accelerometers. The client computing device may transmit the images, along with the additional sensor data, to a remote server that may generate virtual model 712 based on the images and the additional sensor data. Alternatively, the client computing device may be configured to generate the virtual model locally.

The virtual model 712 may then be displayed by way of a user interface of the client computing device. The client computing device may prompt for designation of a drop-off spot within virtual model 712. User designation of drop-off spot 714 may be received by way of the user interface. The user may use gestures (e.g., touching, clicking, scrolling, etc.) to place a virtual "bullseye" marker within the displayed virtual model 712 to designate target drop-off spot 714. Thus, a recipient may select a spot that the recipient deems appropriate or safe for package delivery. For example, the recipient may designate that packages be placed next to the front door of the recipient's residence in a spot where the packages will not block the front door. Similarly, the recipient may designate to have packages placed in a backyard of the recipient's residence, behind a locked gate, as opposed to in the front of the user's residence.

Trajectory planner 612 may be configured to navigate the delivery vehicle to the general vicinity of delivery destination 702 based at least on GPS coordinates. Upon arriving within a threshold distance of delivery destination 702 (e.g., a threshold defined by the accuracy limit of GPS), trajectory planner 612 may be configured to navigate the delivery vehicle based on sensor data 600. Trajectory planner 612 may cause delivery vehicle 180 to scan delivery destination 702 by panning the sensor field of view 706 over the extent of delivery destination 702, as shown in FIG. 7A. In some embodiments, virtual model generator 602 may be configured to generate a virtual model based on sensor data 600. Accordingly, trajectory planner 612 may navigate the delivery vehicle based on the determined virtual model. Alternatively, trajectory planner 612 may navigate the delivery vehicle directly based on sensor data 600.

Figure 7C:
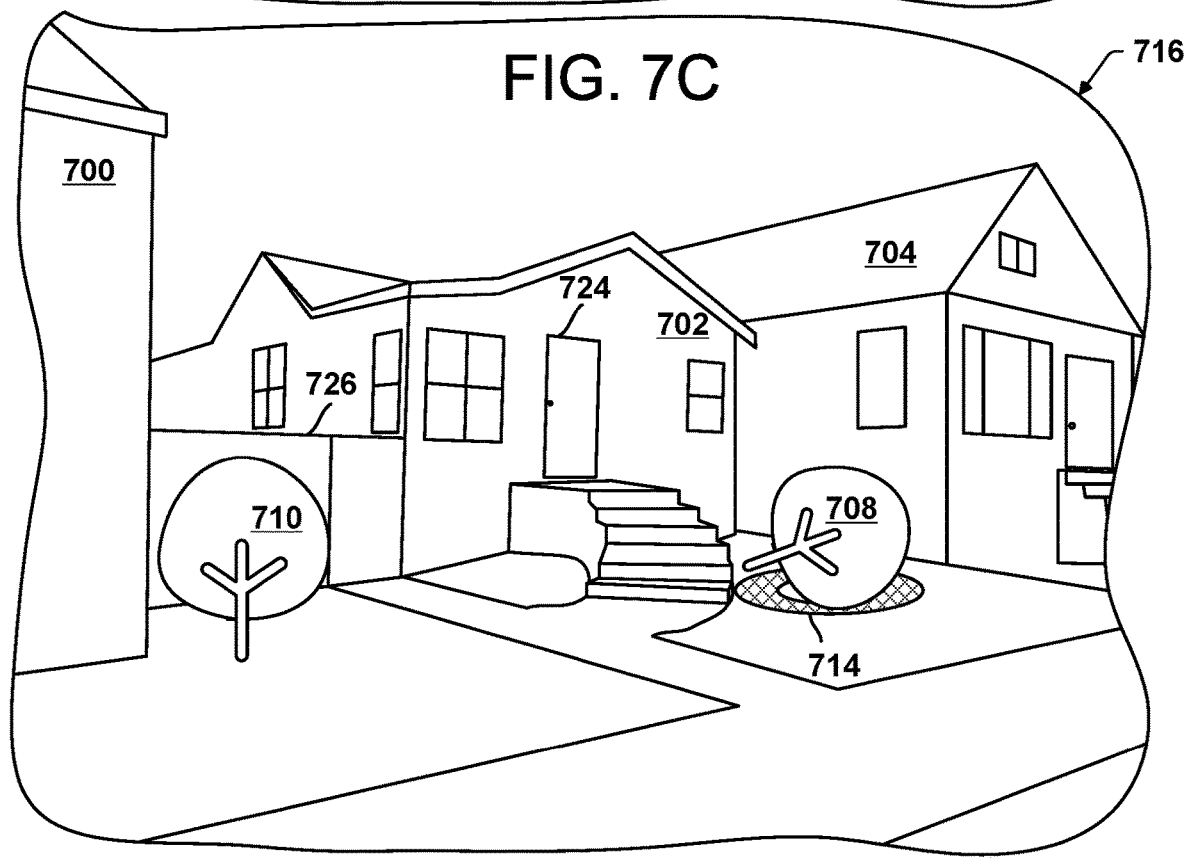

When a target drop-off spot for the object has been designated by the recipient, trajectory planner 612 may determine whether the object can be delivered to and placed at the target drop-off spot. For example, trajectory planner 612 may determine whether target drop-off spot 714 is large enough to accommodate the object. Trajectory planner 612 may also determine whether target drop-off spot 714 is empty or occupied by another object. For example, trajectory planner 612 may determine that tree 708 has fallen and is blocking target drop-off spot 714, as illustrated in FIG. 7C. The obstruction may be determined by comparing virtual model 716, generated based on sensor data 600, to virtual model 712, generated at an earlier time based on, for example, sensor data collected by the object recipient, or to another earlier-captured virtual model. In particular, by comparing the local area about drop-off spot 714 between models 716 and 712, trajectory planner 612 may determine that the physical features in and about drop-off spot 714 in model 716 are changed beyond a threshold relative to the physical features in and about drop-off spot 714 in model 712. In another example, rather than comparing two virtual models, the obstruction of drop-off spot 714 may be identified by determining that the area local area about drop-off spot 714 is not level or that an object is already placed therein.

Further, trajectory planner 612 may plan a path to the target drop-off spot 714 (i.e., the user-designated drop-off spot). In some instances, trajectory planner 612 may determine, based on sensor data 600 and/or the virtual model generated therefrom, that a path to the target drop-off spot is obstructed by another object within the physical environment of delivery destination 702. In other words, given the physical capabilities of delivery vehicle 180, a path from a current location of the delivery vehicle to target drop-off spot 714 might not be available.

In other instances, trajectory planner 612 may determine that a target drop-off spot has not been designated within the delivery destination. In further instances, trajectory planner 612 may determine that target drop-off spot 714 is not obstructed and is reachable by the delivery vehicle but may nevertheless determine an alternative drop-off spot. The alternative drop-off spot may be compared to the target drop-off spot and a more optimal of the two may be selected as the drop-off spot for the object. Accordingly, when a target drop-off spot is occupied, unreachable, sub-optimal, or otherwise unavailable, ANN 610 may be used to autonomously determine a drop-off spot within the delivery destination 702.

Figure 7D:
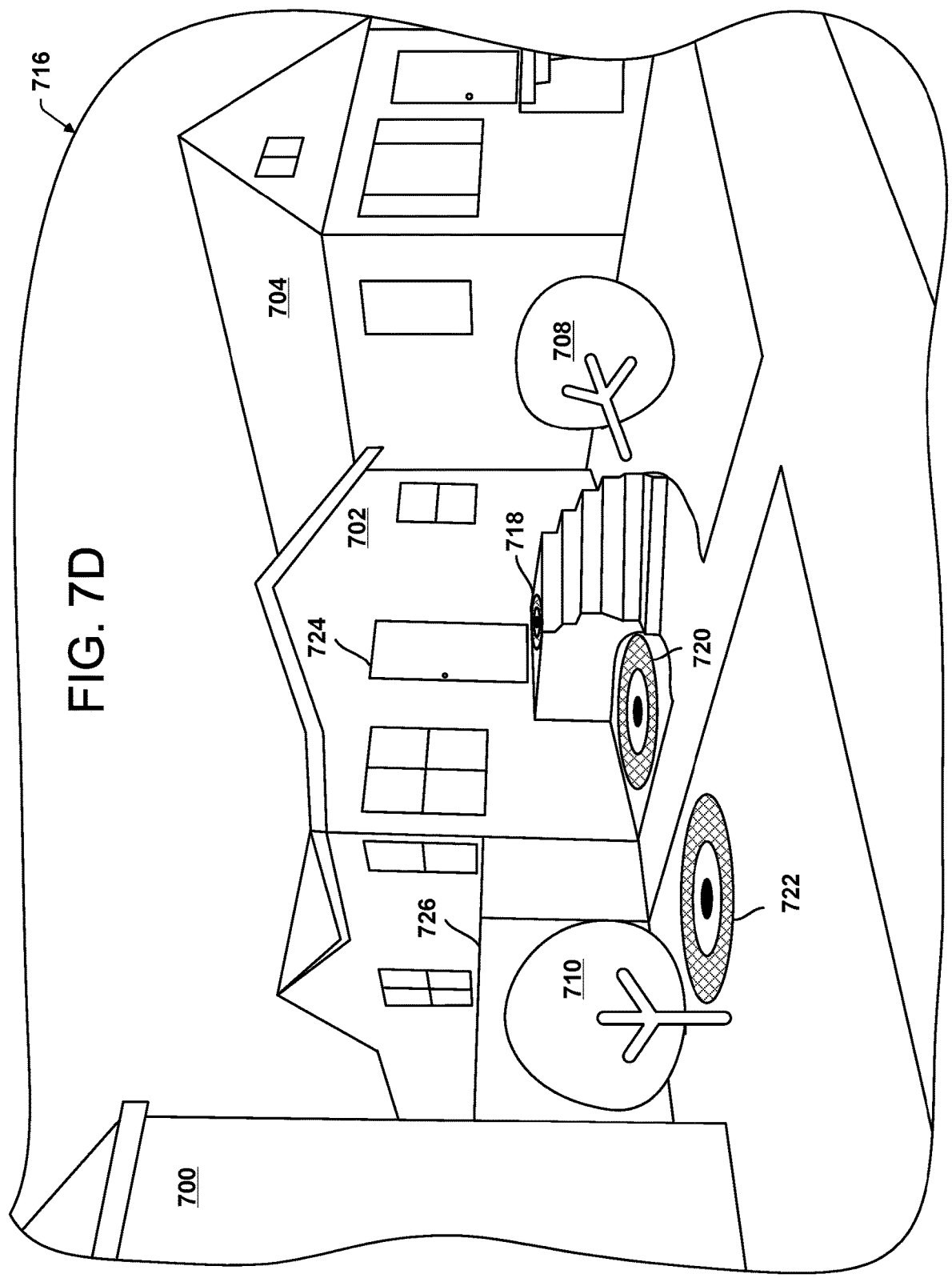
FIG. 7D illustrates candidate drop-off spots, according to an example embodiment.

In some embodiments, ANN 610 may be configured to determine a plurality of candidate drop-off spots 718, 720, and 722, as illustrated in FIG. 7D. Further, a confidence level associated with each of the plurality of candidate drop-off spots 718-722 may be determined. A drop-off spot associated with a highest confidence level may be selected from the plurality of candidate drop-off spots 718-722 to be the drop-off spot for the object.

In some embodiments, a predicted amount of time to move the object to a respective candidate drop-off spot and place the object at the respective candidate drop-off spot may be determined for each respective candidate drop-off spot of the plurality of candidate drop-off spots 718-722. The predicted amount of time may be based on distance between the respective drop-off spot and the delivery vehicle and physical features in and around the respective drop-off spot. For example, object placement at candidate drop-off spot 722 may require additional time to carefully navigate around tree 710. The drop-off spot for the object may be selected from the plurality of candidate drop-off spots based on the predicted amount of time determined for each respective candidate drop-off spot and an amount of time allotted to delivery of the object by, for example, dispatch system 614.

Additionally, in some embodiments, the confidence level associated with each respective drop-off spot of the plurality of candidate drop-off spots 718-722 may be considered when selecting the drop-off spot in addition to the predicted amounts of time and the time allotted for delivery of the object. For example, a candidate drop-off spot with (i) a confidence level above a threshold confidence value and (ii) a predicted amount of time below a time threshold (e.g., below the amount of time allotted for delivery of the object) may be selected as the drop-off spot for the object.

ANN 610 may be configured to determine the drop-off spot based on sensor data 600, as previously described with respect to FIG. 3. In particular, the sensor data may represent physical features of the delivery destination, including topological features, vegetation, buildings, and other objects contained in, adjacent to, or observable from the delivery destination.

In some embodiments, the physical features may include another object previously-delivered to (and not yet removed by the recipient from) the delivery destination. The drop-off spot for the object may be determined based on a position of the previously-delivered object within the delivery destination. For example, ANN 610 may autonomously determine a drop-off spot for the object. The system may then compare a position of the autonomously-determined drop-off spot to the position of the previously delivered object. If the positions match or are within a threshold distance of one another, the system may determine to place the object at or near the previously-delivered object. Alternatively, if the position of the autonomously-determined drop-off spot and the position of the previously delivered object differ by more than a threshold distance, the system may, based on a confidence level associated with the autonomously-determined drop-off spot, determine to place the object at the autonomously-determined drop-off spot, at or near the previously-delivered object, or may request a human pilot/operator to select the drop-off spot.

Further, in some embodiments, ANN 610 may also be trained to receive as input, via additional input nodes, and consider in determining the drop-off spot a plurality of additional data. The additional data may include, for example, contextual data 604, recipient-specific data 606, and delivery vehicle capabilities 608. In some embodiments, each of the previously-designated drop-off spots based on which ANN 610 is trained may be associated with corresponding additional data.

Contextual data 604 may include, for example, current and future weather conditions, crime statistics of the neighborhood surrounding the delivery destination, and foot traffic patterns along walkways near the delivery destination, among other data. Based on this information, ANN 610 may be configured to consider, for example, the safety of the determined drop-off spots. For example, when contextual data 604 indicates incoming rain, ANN 610 may determine that, in spite of blocking door 724, the object is best left at drop-off spot 718 atop the stairs rather than at drop-off spots 720 or 722 within lower areas where rainwater might pool, as illustrated in FIG. 7D. In another example, when contextual data 604 indicates that that delivery destination 702 is located in a neighborhood with a high rate of crime or on a street with foot traffic above a threshold foot traffic value, ANN 610 may determine a drop-off spot in the backyard, behind fence 726. In some embodiments, this determination may take place prior to dispatch of the delivery vehicle so that a delivery vehicle capable of traversing fence 726 may be dispatched (e.g., an aerial delivery vehicle).

Recipient-specific data 606 may include, for example, boundaries of the recipient's property, drop-off spots previously designated by the recipient, pick-up spots at which the recipient has previously left objects for pick up by delivery vehicles, ratings provided by the recipient of previous autonomously-selected drop-off spots at which objects have been placed, and a size, a weight, content, fragility, value, or another parameter of the object to be delivered to the recipient. In some instances, parameters of the object to be delivered to the recipient may form a separate, object-specific data category. Additionally, recipient-specific data 606 may, in some embodiments, indicate regions within delivery destination 702 that the recipient indicated are not to be used as drop-off spots (e.g., never deliver to the backyard). In some embodiments, recipient-specific data 606 may be given greater weight in determining the drop-off spot to more accurately reflect the preferences of individual object recipients.

For example, object dimensions may be considered by ANN 610 to determine a drop-off spot large enough to accommodate the object. Further, ANN 610 may also determine, based on the object dimensions, an area or volume at the drop-off location to be occupied by the object. Thus, the output of ANN 610 may, in addition to providing data indicative of a location of the drop-off spot within the delivery destination, provide data indicative of the area or volume to be occupied the object. For example, the data indicative of the volume may include a length, a width, a height, and an orientation in which to place the object. Accordingly, the drop-off spot may be visualized in virtual model 716 as a 3D outline indicating where the object will be placed. Further, the instructions to cause the delivery vehicle to move to and place the object at the drop-off spot may include instructions to orient the object within and according to the determined area.

Delivery vehicle capabilities 608 may include data representing operations that the delivery vehicle can perform based on physical construction of the delivery vehicle. The data may be available for each type of delivery vehicle available in UDV system 200. For example, for a ground-based delivery vehicle, delivery vehicle capabilities data 608 may indicate a range of surface textures which the vehicle is capable of traversing, a maximum height difference that wheels, tracks, or legs of the vehicle are able to overcome, and a maximum height to which the delivery vehicle can lift the object.

In determining the drop-off spot, ANN 610 may rely on data corresponding to the type of delivery vehicle selected to deliver the object to the delivery destination. Thus, by considering delivery vehicle capabilities, ANN 610 may determine drop-off spots that the delivery vehicle is likely able to reach (i.e., drop-off spots to which a feasible trajectory can be planned by trajectory planner 612). In some embodiments, trajectory planner 612 may operate to verify that the drop-off spot determined by ANN 610 is reachable. When the determined drop-off spot is unreachable, trajectory planner 612 may provide instructions to ANN 610 to cause ANN 610 to determine another drop-off spot or provide coordinates of another drop-off spot from the plurality of candidate drop-off spots determined by ANN 610.

Once a satisfactory drop-off spot is determined, the object may be moved to and placed at the determined drop-off spot, as illustrated in FIG. 7E. Aerial delivery vehicle 180 may navigate above selected drop-off spot 720, descend with object 728, and release object 728 onto drop-off spot 720.

VII. EXAMPLE USER FEEDBACK OPERATIONS

Figure 8A:
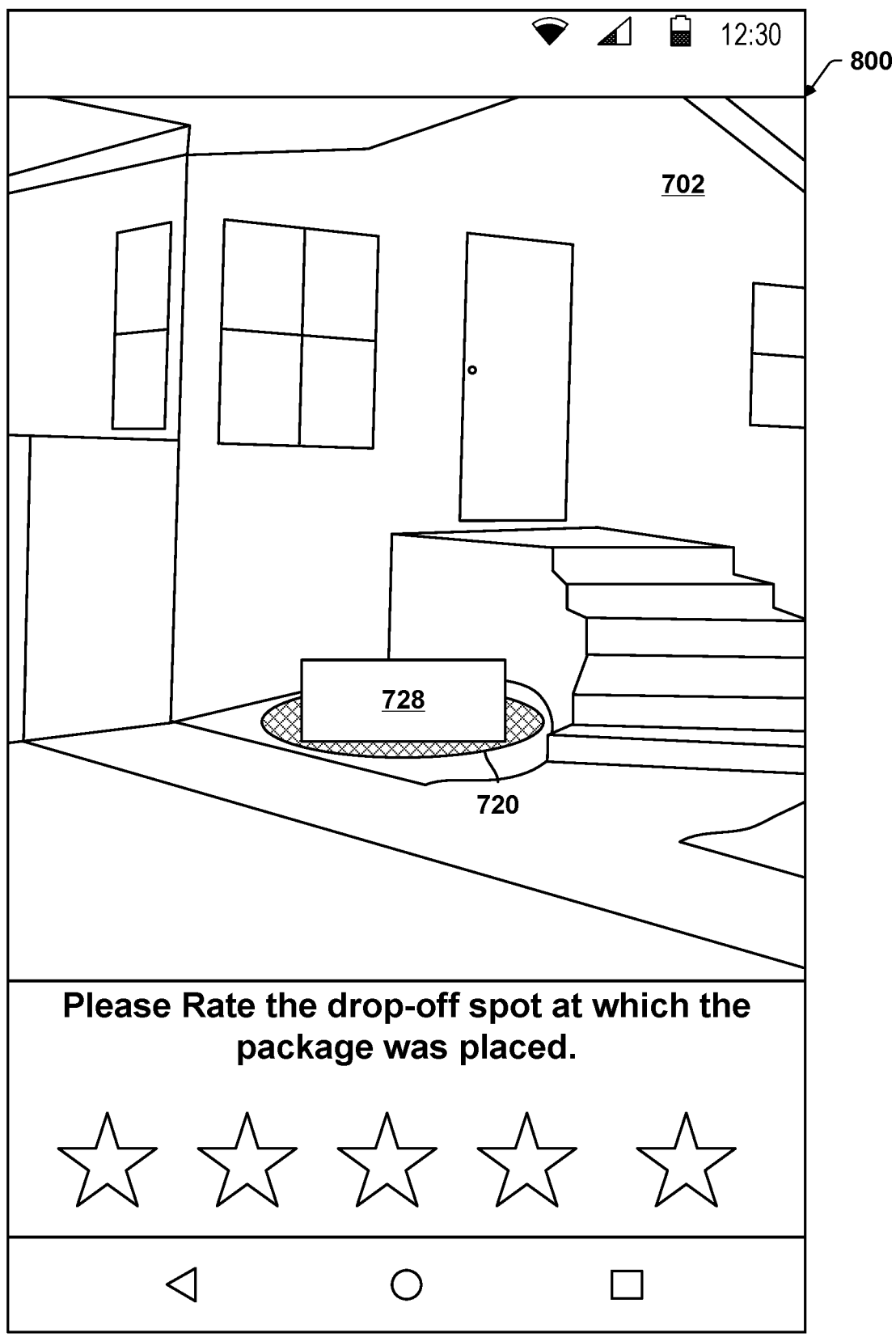
FIG. 8A illustrates a user interface, according to an example embodiment.

FIG. 8A illustrates an example user interface 800 of a computing device for soliciting feedback from users regarding user satisfaction with drop-off spots selected autonomously by the system. For example, after the delivery vehicle places object 728 at the drop-off spot, the delivery vehicle may capture an image showing object 728 at the drop-off spot. The image or model, as shown in FIG. 8A, may be provided to the object recipient as confirmation of object delivery. The object recipient may also be prompted to rate the drop-off spot 720 at which object 728 (e.g., a package) was placed. The rating may be provided by selecting a number of stars that most closely corresponds to the user's satisfaction. Alternatively, the rating may be a number selected from a predefined scale (e.g., 1 to 10, where 10 indicates complete satisfaction).

Figure 8B:
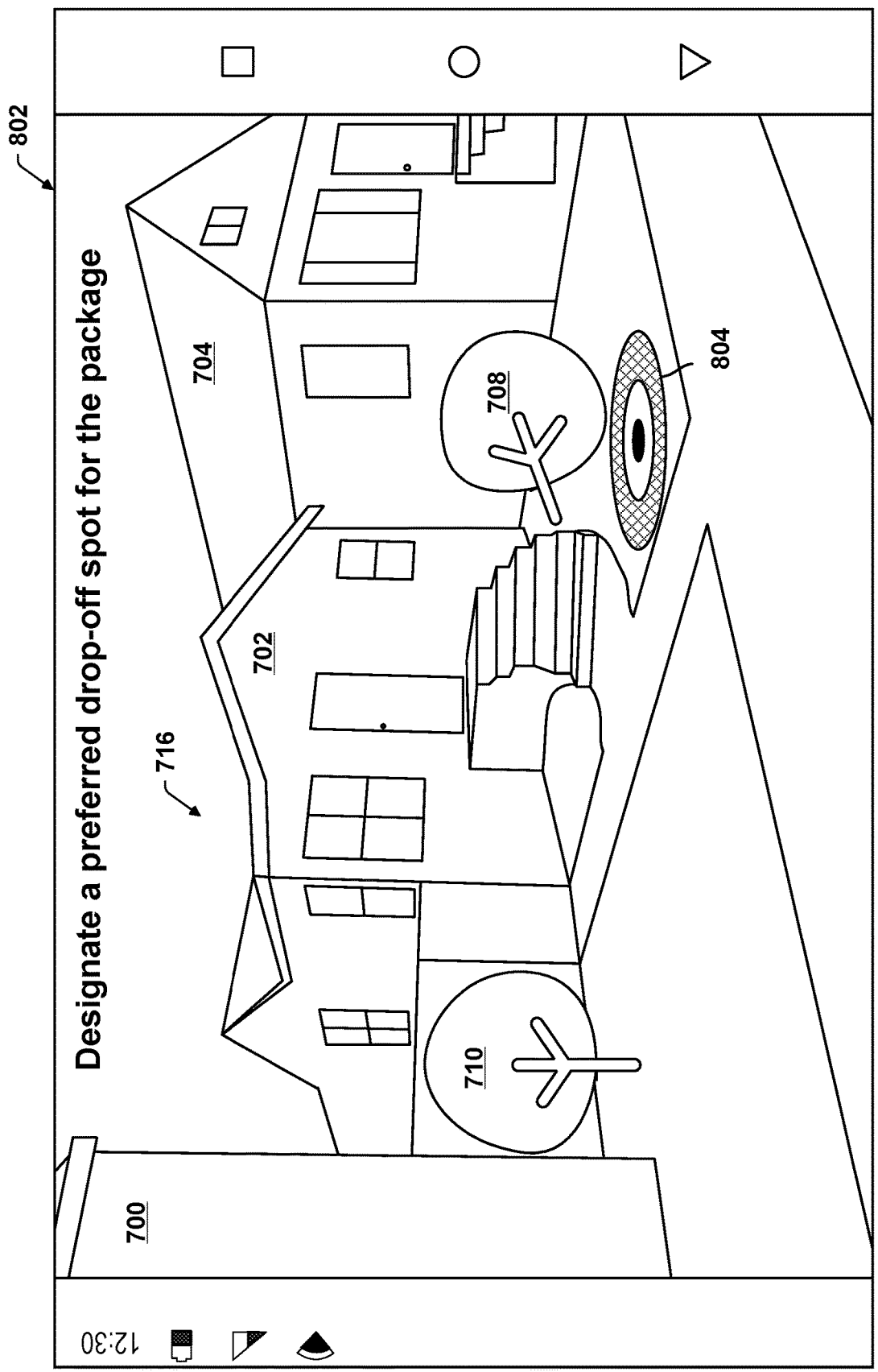
FIG. 8B illustrates another user interface, according to an example embodiment.

Further, in some embodiments, when the user feedback indicates that the recipient is dissatisfied with drop-off spot 720 at which object 728 was placed (e.g., when the rating is below a threshold rating value), the user may be prompted to indicate an alternative drop-off spot within the delivery destination at which the user would have preferred the object to be placed. FIG. 8B illustrates an example user interface 802 of a computing device for prompting the user to designate the alternative drop-off spot. User interface 802 may display the virtual model 716 of delivery destination 702. The user may be able to navigate through model 716 using various gestures that the computing device is configured to recognize. For example, the user might be able to view the backyard of delivery destination 702 by rotating virtual model 716.

The user may designate a preferred drop-off spot by placing "bullseye" marker 804 at the preferred location. The placement of marker 804 may be limited to portions of delivery destination 702 that are reachable to the particular type of delivery vehicle that delivered object 728 and that are large enough to accommodate the size of object 728. When the user attempts to place marker 804 at a location that is unreachable to the particular type of delivery vehicle, the user may be informed that delivery to the selected location requires a different type of delivery vehicle that may be associated with additional delivery charges.

Figure 8C:
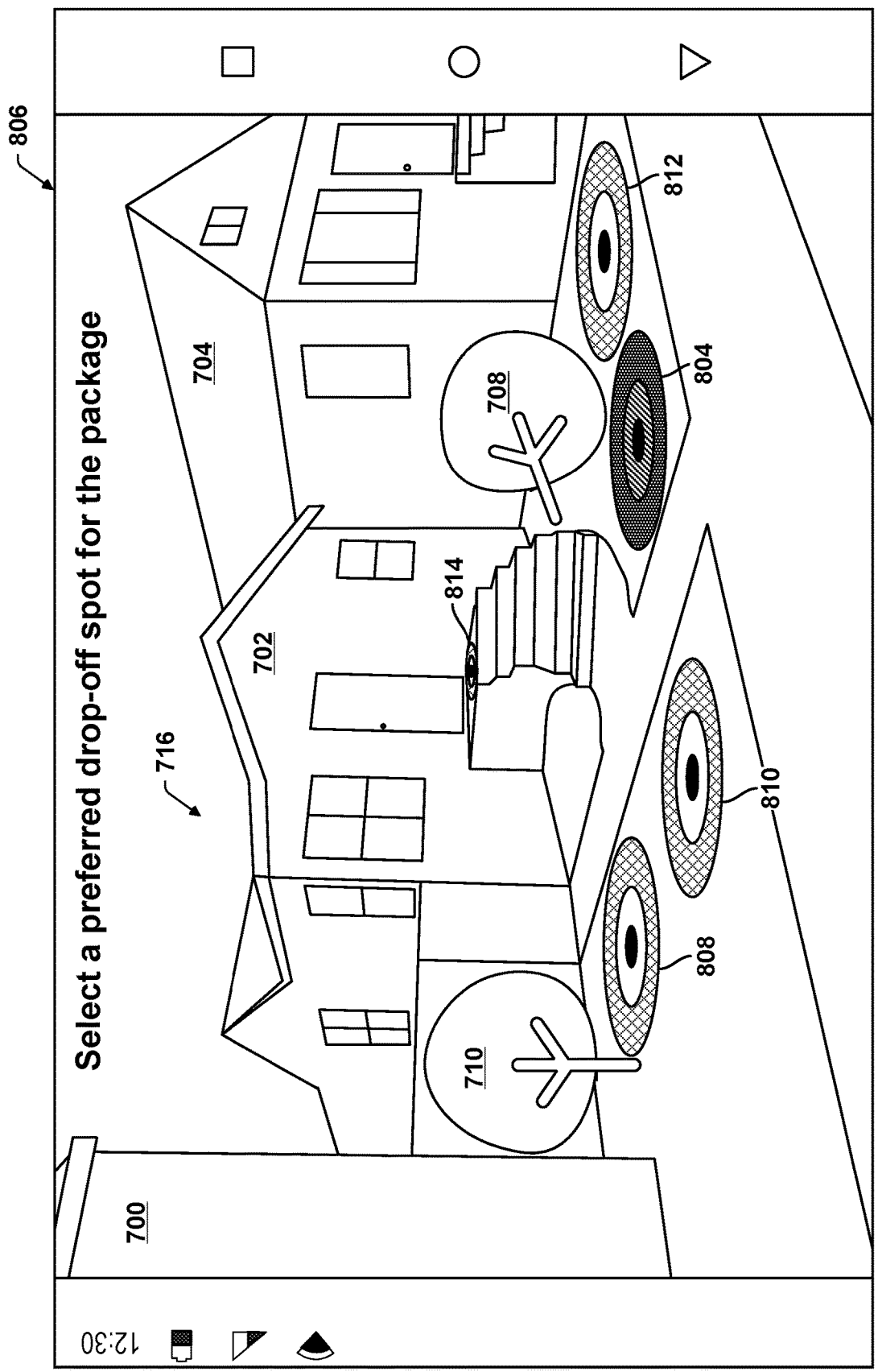
FIG. 8C illustrates a further user interface, according to an example embodiment.

Alternatively, the user may designate the preferred drop-off spot by selecting a desired "bullseye" marker from a plurality of "bullseye" markers corresponding to a plurality of predetermined alternative drop-off spots. Each of the plurality of predetermined alternative drop-off spots may be reachable to the particular type of delivery vehicle that delivered object 728 and may be large enough to accommodate the size of object 728. Thus, attempts to place the "bullseye" marker at unsuitable spots may be avoided. FIG. 8C illustrates an example user interface 806, displaying the virtual model 716 of delivery destination 702, for prompting the user to select the alternative drop-off spot from a plurality of predetermined alternative drop-off spots 804, 808, 810, 812, and 814. The user may select "bullseye" marker 804 by, for example, tapping or holding marker 804. The selection may be indicated by highlighting or otherwise changing the visual appearance of the selected marker 804, as illustrated in FIG. 8C. The user may be able to navigate through model 716 to view additional candidate drop-off spots (i.e., "bullseye" markers) located in, for example, the backyard of delivery destination 702.

In some embodiments, user interfaces 800, 802, and 806 may be used to solicit user feedback prior to object delivery. For example, the delivery vehicle may arrive at the delivery destination and the control system (e.g., trajectory planner 612) may determine that a drop-off spot for the object has not been designated or is otherwise unavailable or inaccessible. The control system may then, by way of the ANN, determine a candidate drop-off spot for the object and may prompt a user to evaluate the candidate drop-off spot. For example, user interface 800 may be used to display the determined candidate drop-off spot along with a prompt to accept or decline the displayed drop-off spot. When the user declines, user interface 802 or 806 may be used to prompt for designation of an alternative drop-off spot. In this case, the user may be the object recipient, an operator within the delivery system, or a third-party contracted to evaluate the drop-off spots.

In some embodiments, user interface 800, 802, or 806 may be used as part of a video game or other software application intended to solicit designations of drop-off spots within a plurality of delivery destinations. The game or application may be executable on, for example, a smartphone or tablet. The drop-off spots designated in the video game or application may be used to build up a database of the previously-designated drop-off spots used to train the ANN. The database may additionally include drop-off spots selected or designated in any of the ways previously and hereafter discussed. The video game or application may provide users with rewards in exchange for designating drop-off spots. The rewards may include, for example, in-game rewards (e.g., additional lives, turns, or bonuses), cash rewards (e.g., $0.01 per designated drop-off spot), or free object deliveries by the delivery system, among other possibilities.

In one example, the video game may include, as part of the gaming mechanics thereof, operations for designating drop-off spots. For example, the video game may include piloting an aerial vehicle to deliver objects to homes. The video game may reward placement of packages in safe, convenient places and may penalize placement in undesired locations. The video game may further simulate weather conditions, crime rates, recipient preferences, vehicle capabilities, etc., as discussed above, to increase or maximize the amount of training data collected. In another example, the drop-off spot designation game or application may be associated with one or more third-party games or applications and may be used to earn rewards in the third-party games or applications. For example, additional lives may be earned within a third-party video game or additional viewing time may be earned within a streaming application in exchange for designating a number of drop-off spots.

The feedback provided by the user may be used to retrain and update the ANN to more accurately determine drop-off spots in the future. Retraining may include adjusting the respective weighting values associated with connections between at least a portion of the nodes of the ANN. The ANN may be retrained and updated continuously as additional training data becomes available.

VIII. EXAMPLE HEURISTICS MODELS

Figure 9:
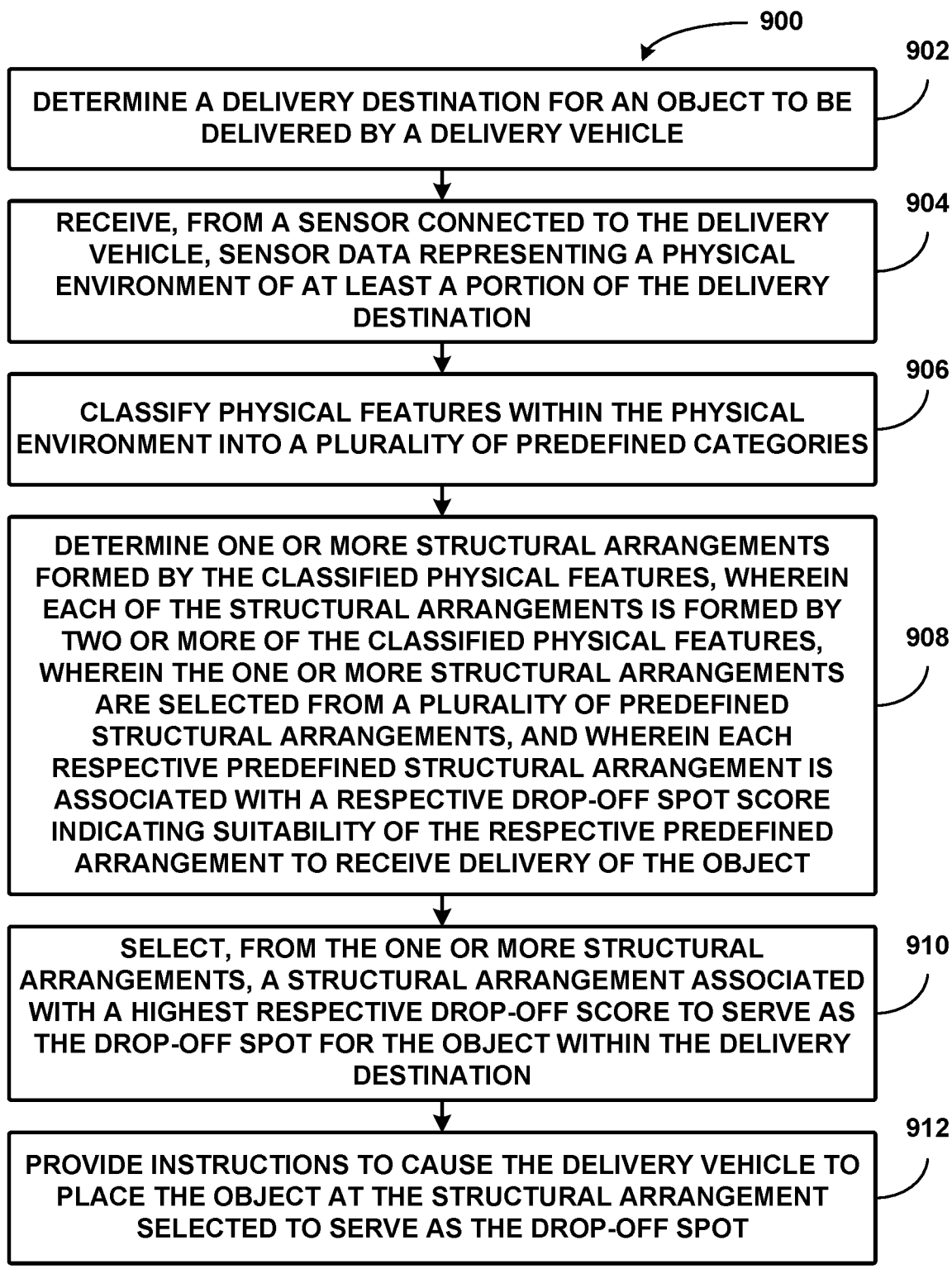
FIG. 9 illustrates another flow diagram, according to an example embodiment.

In some embodiments, drop-off spots may be determined using a heuristics model configured to determine drop-off spots using predefined rules. FIG. 9 illustrates a flow diagram 900 of example operations of a heuristics approach for delivering an object to a drop-off spot. Much like the operations of flow diagram 300 in FIG. 3, the operations of flow diagram 900 may be performed by one or more computing devices within the delivery system including, for example, a server device in communication with a delivery vehicle, a control system of the delivery vehicle, one or more client computing devices, or a combination thereof.

As previously described with respect to FIG. 3, in block 902, a delivery destination may be determined for an object to be delivered by a delivery vehicle. Similarly, in block 904, sensor data representing a physical environment of at least a portion of the delivery destination may be received from a sensor connected to the delivery vehicle.

Figure 10A:
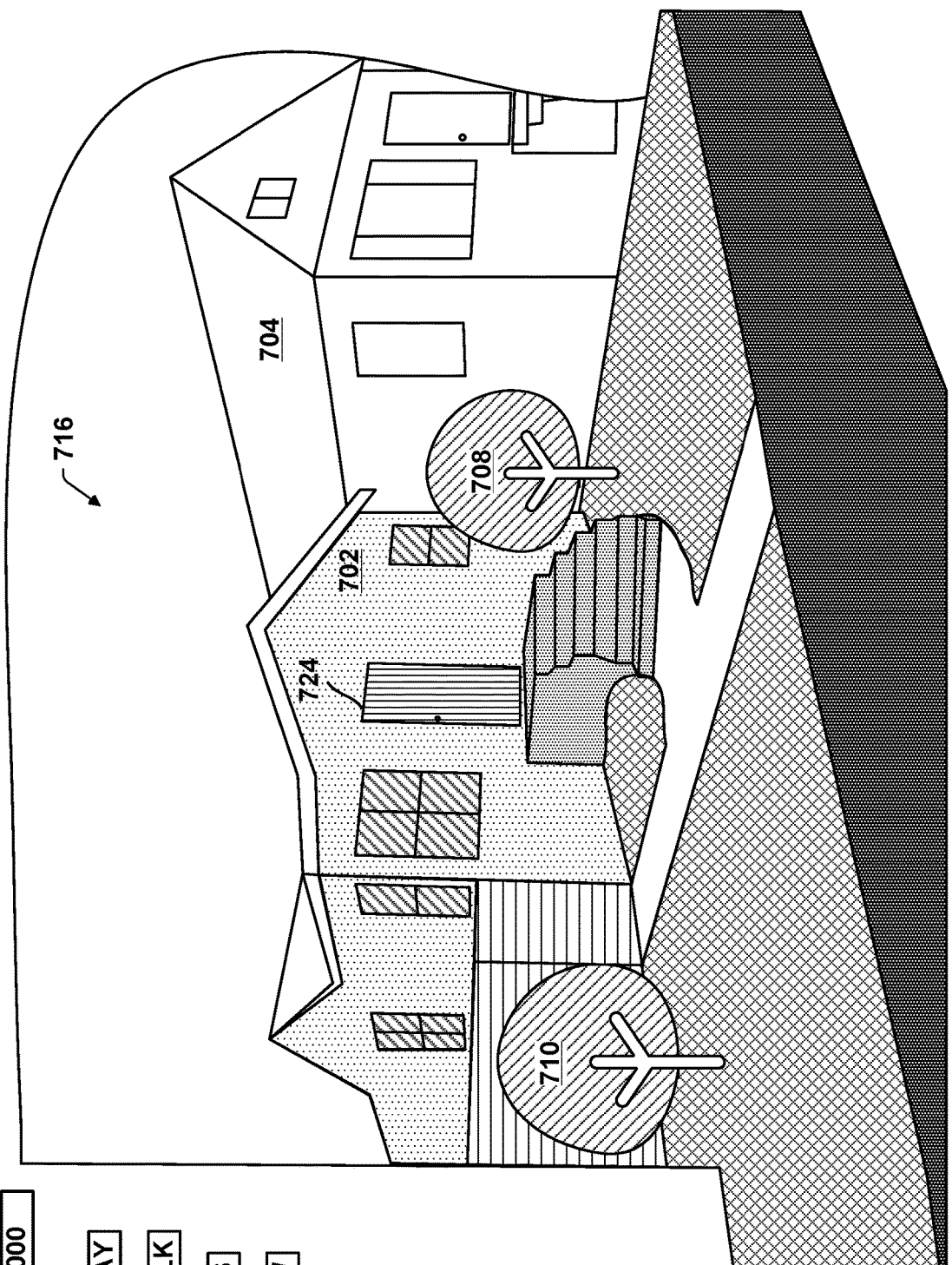
FIG. 10A illustrates classified physical features, according to an example embodiment.

In block 906, physical features within the physical environment may be classified into a plurality of predefined categories. In some embodiments, the classification may be performed by one or more computer vision algorithms based on color, texture pattern, size, or shape, among other possibilities. FIG. 10A illustrates an example classification of physical features within virtual model 716. The predefined categories may include, for example, classifications such as "walkway," "sidewalk," "stairs," "window," "fence," "door," "grass," "tree," and "wall," as illustrated by legend 10000. The classification of physical features within model 716 are visualized by shading of the classified physical features according to the corresponding shading pattern indicated within legend 1000. Additional categories not herein illustrated may be possible. For example, categories such as "concrete wall" or "brick wall" may be included.

In block 908, one or more structural arrangements formed by the classified physical features may be determined. Each of the structural arrangements may be formed by two or more of the classified physical features. The one or more structural arrangements may be selected from a plurality of predefined structural arrangements. Each respective predefined structural arrangement may be associated with a respective drop-off spot score indicating suitability of the respective predefined arrangement to receive delivery of the object.

The structural arrangements may be combinations of low-level physical features that form more complex physical features. Thus, the structural arrangements may be abstractions of combinations of the classified physical features that facilitate the process of determining a drop-off spot. Two or more classified physical features may for a structural arrangement when, for example, the two or more classified physical features have a particular geometric relationship with respect to one another.

FIG. 10B illustrates examples of structural arrangements formed from combinations of two or more classified physical features. For example, row 1004 of table 1002 shows that a walkway adjacent or near a fence and a wall may indicate a backyard entrance. Row 1006 shows that a door within a wall to which stairs are adjacent or attached may indicate an entrance to the house. Row 1008 shows that grass adjacent to a wall and stairs may indicate a lawn in front of the house. Similarly, a walkway adjacent to stairs may indicate the bottom of the stairs, as shown in row 1010, two walls adjacent to a walkway may indicate a corner, as shown in row 1012, and a door in a wall to which an awning is attached may indicate a covered house entrance, as illustrated in row 1014.

Additional classifications of physical objects and additional structural arrangements not herein described may be used to determine the drop-off spot. Further, the system may consider additional relationships, geometric or otherwise, between the classified features in determining the structural arrangements. For example, in order for a combination of a wall, door, and awning to form a covered house entrance, the system may determine whether the awning is positioned above the door (e.g., the awning may be connected to the wall and positioned above a window, thus not forming a covered house entrance). In another example, in order for a combination of a wall, wall, and walkway to form a corner, these three features might need to be approximately orthogonal (e.g., within 10 degrees of orthogonal).

The possible structural arrangements that may be formed from classified physical features may be predefined so that a drop-off score can be associated with each structural arrangement. In some embodiments, the drop-off score may be a single value indicating the suitability of a particular structural arrangement to serve as a drop-off spot. For example, the house entrance may be associated with a drop-off score of 5 on a scale from 0 to 10, where 0 indicated an undesirable spot and 10 indicates a preferred spot. This score may represent the generalization that while some recipients prefer objects to be left close to the house entrance, others prefer the object left somewhere else such that the objects do not block the house entrance. In some embodiments, the drop-off score for a particular structural arrangement may be conditioned upon additional data such as, for example, contextual data 604 and recipient-specific data 606 discussed with respect to FIG. 6.

FIG. 10C illustrates an example set of drop-off scores for structural arrangements where the drop-off scores are conditioned upon the additional data (i.e., the contextual conditions). For example, a covered house entrance may be associated with a higher drop-off score when the weather is expected to be rainy than when the weather is expected to be sunny (i.e., 9 vs 5) because recipients would prefer the object to be shielded from the rain, even if placement of the object in front of the house entrance might obstruct entry and exit. However, when the house entrance is not covered by an awning, an object left in front of the house entrance may be an obstacle to quick entry/exit without the benefit of shielding from the rain. Thus, an uncovered house entrance may be associated with a lower score when the weather is expected to be rainy than when the weather is expected to be sunny (i.e., 1 vs 6). Accordingly, in general, structural arrangements that shield the object from the rain may be assigned higher scores when weather is or is predicted to be rainy.

In another example, a particular object recipient may indicate a set of personal delivery preferences. For example, the particular recipient may arrive home from work or school at around 6 PM. The particular recipient may thus indicate to the delivery system a preference that objects are to be left near the house entrance if they are delivered before 6 PM. Accordingly, upon arriving home, the particular recipient may notice any objects left in front of the house entrance and bring them inside. However, if objects are delivered past 6 PM, the particular recipient might not notice the object placed in front of the house entrance until the next morning at which point the particular recipient might trip over the object while exiting the house.

In yet another example, the scores associated with the structural arrangements may be conditioned upon the level of foot traffic around the delivery destination. When foot traffic is high, structural arrangements that are further away from public walkways may be associated with higher scores than structural arrangements that are near the public walkways. Thus, the house entrance may be a better drop-off spot than the lawn in front of the house when foot traffic is high. The scores may be further conditioned upon additional user preferences and contextual conditions not herein described.

The system may determine a drop-off score for each of the determined structural arrangements based on any user preferences and contextual conditions present at the time of delivery. The drop-off score may be determined by, for example, averaging the sum of the individual sub-scores corresponding to each applicable contextual condition for each of the structural arrangements. In some embodiments, structural arrangements that cannot be reached by a particular delivery vehicle may be omitted from the scoring process. Further, structural arrangements that are too small to accommodate the size of the object may also be omitted from the scoring process.

In block 910, the system may select, from the one or more structural arrangements, a structural arrangement associated with a highest respective drop-off score to serve as the drop-off spot for the object within the delivery destination.

In block 912, the system may provide instructions to cause the delivery vehicle to place the object at the structural arrangement selected to serve as the drop-off spot. Thus, the object may be delivered to a drop-off spot most likely to be satisfactory to the object recipient given the recipient preferences and any current or future conditions at the delivery destination.

In some embodiments, the scores and subscores associated with each structural arrangement may be determined based on the plurality of previously-designated drop-off spots associated with respective additional data, as previously discussed. Further, in some embodiments, the scores and subscores may be updated based on feedback from object recipients, as previously discussed.

IX. EXAMPLE HYBRID MODELS

In some embodiments, aspects of the machine learning model and the heuristics model may be combined to form a hybrid model for determining drop-off spots. For example, classification of the physical features may be performed by a machine learning approach such as an ANN or a state vector machine (SVM) trained to classify physical features within delivery destinations. Similarly, in some examples, the structural arrangements may be determined using a machine learning model. The scores may be encoded using an ANN may be updated by retraining the ANN. An example hybrid model may use a first ANN to classify the physical features, heuristic rules to group the classified physical features into structural arrangements, and a second ANN to determine the drop-off spot score associated with each structural arrangement.

Additionally, in some embodiments, the ANN model for determining drop-off spots, the heuristics model for determining drop-off spots, and/or the hybrid model for determining drop-off spots may be used in parallel. For example, each model may be used to determine a plurality of candidate drop-off spots, each associated with a corresponding confidence level or drop-off spot score. The confidence levels and the drop-off spot scores provided by the respective model may be normalized to arrive at a standardized confidence metric. The standardized confidence metric may be used to directly compare the results of the models. Thus, one model may be used to verify the accuracy of the other model(s), one model may be given more weight than the other depending on the state of a particular delivery destination, and/or one model may be used to train the other model(s).

X. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
   an unmanned aerial delivery vehicle;
   a sensor connected to the unmanned aerial delivery vehicle; and
   a control system comprising one or more processors that are configured to:
   determine a delivery destination for an object to be delivered by the unmanned aerial delivery vehicle;
   receive, from the sensor, three-dimensional sensor data representing three-dimensional physical features of a physical environment of at least a portion of the delivery destination;
   determine a virtual model of the delivery destination based on the three-dimensional sensor data, wherein the virtual model is a three-dimensional model or a two-dimensional model that includes depth information;
   determine a drop-off spot for the object within the delivery destination by way of an artificial neural network (ANN) trained to determine the drop-off spot based on (a) a plurality of previously-designated drop-off spots designated for previously-delivered objects by respective object recipients, by respective human pilots, or by the ANN, or (b) a plurality of previously-designated pick-up spots designated by the respective object recipients for previously placed objects, wherein the ANN comprises (i) an input node configured to receive as input the virtual model, (ii) a plurality of hidden nodes connected to the input node, and (iii) an output node connected to one or more of the plurality of hidden nodes and configured to provide data indicative of a location of the drop-off spot within the delivery destination; and
   provide instructions to cause the unmanned aerial delivery vehicle to move to the drop-off spot and place the object at the drop-off spot.

2. The system of claim 1, wherein the drop-off spot is an alternative drop-off spot, and wherein the control system is further configured to:
   receive data indicative of a user-selected drop-off spot within the delivery destination;
   determine, based on the sensor data, that the object cannot be placed at the user-selected drop-off spot; and
   in response to determining that the object cannot be placed at the user-selected drop-off spot, determine the alternative drop-off spot within the delivery destination by way of the ANN.

3. The system of claim 2, wherein the control system is configured to determine that the object cannot be placed at the user-selected drop-off spot by:
   determining, based on the sensor data, that the user-selected drop-off spot is occupied by another object.

4. The system of claim 2, wherein the control system is configured to determine that the object cannot be placed at the user-selected drop-off spot by:
   determining, based on the sensor data, that a path to the user-selected drop-off spot is obstructed by another object within the physical environment.

5. The system of claim 1, wherein the control system is further configured to:
   determine a trajectory for the unmanned aerial delivery vehicle to follow to move from a current location of the unmanned aerial delivery vehicle to the location of the drop-off spot within the delivery destination.

6. The system of claim 1, wherein the control system is configured to determine the drop-off spot for the object by:
   determining a plurality of candidate drop-off spots by way of the ANN;
   determining a confidence level associated with each of the plurality of candidate drop-off spots; and
   selecting, from the plurality of candidate drop-off spots, a drop-off spot associated with a highest confidence level to be the drop-off spot for the object.

7. The system of claim 1, wherein the control system is further configured to:

determine an amount of time allotted to delivery of the object to the delivery destination;
determine a plurality of candidate drop-off spots for the object within the delivery destination by way of the ANN;
for each respective candidate drop-off spot of the plurality of candidate drop-off spots, determine a predicted amount of time to move the object to the respective candidate drop-off spot and place the object at the respective candidate drop-off spot; and
based on (i) the amount of time allotted to delivery of the object and (ii) the predicted amount of time determined for each respective candidate drop-off spot, select, from the plurality of candidate drop-off spots, the drop-off spot for the object.

8. The system of claim 1, wherein the control system is configured to determine the drop-off spot by:
classifying, by way of the ANN, physical features within the physical environment into a plurality of predefined categories;
determining one or more structural arrangements formed by the classified physical features, wherein each of the structural arrangements is formed by two or more of the classified physical features, wherein the one or more structural arrangements are selected from a plurality of predefined structural arrangements, and wherein each respective predefined structural arrangement is associated with a respective drop-off spot score indicating suitability of the respective predefined arrangement to receive delivery of the object; and
selecting, from the one or more structural arrangements, a structural arrangement associated with a highest respective drop-off score to serve as the drop-off spot for the object within the delivery destination.

9. The system of claim 1, wherein the control system is further configured to:
determine a dimension of the object; and
determine the drop-off spot within the delivery destination by providing the dimension of the object as input to the ANN, wherein the ANN further comprises an additional input node configured to receive as input the dimension of the object, wherein the ANN is trained to determine the drop-off spot based on respective dimensions of respective objects associated with the plurality of previously-designated drop-off spots.

10. The system of claim 9, wherein the control system is further configured to:
determine an area at the drop-off location to be occupied by the object by providing the dimension of the object as an input to the ANN, wherein the ANN is trained to determine the area at the drop-off location to be occupied by the object based on respective areas occupied by the respective objects associated with the plurality of previously designated drop-off spots, wherein the output node of the ANN is further configured to provide data indicative of the area at the drop-off location to be occupied by the object; and
provide instructions to cause the unmanned aerial delivery vehicle to place the object within the determined area at the drop-off location.

11. The system of claim 1, wherein the control system is further configured to:
determine physical capabilities of the unmanned aerial delivery vehicle, wherein the physical capabilities indicate operations that the unmanned aerial delivery vehicle can perform based on physical construction of the unmanned aerial delivery vehicle; and
determine the drop-off spot within the delivery destination by providing an indication of the physical capabilities of the unmanned aerial delivery vehicle as input to the ANN, wherein the ANN further comprises an additional input node configured to receive as input the indication of the physical capabilities of the unmanned aerial delivery vehicle, and wherein the ANN is further trained to determine the drop-off spot based on physical capabilities of respective delivery vehicles tasked with object delivery to the plurality of previously-designated drop-off spots.

12. The system of claim 1, wherein the ANN is trained to determine the coordinates of the drop-off spot based on respective virtual models corresponding to the plurality of previously-designated drop-off spots.

13. The system of claim 1, wherein connections between nodes of the ANN are associated with respective weighting values, and wherein the control system is further configured to:
receive user feedback from a recipient of the object indicating satisfaction of the recipient with the determined drop-off spot; and
train the ANN based on the received user feedback by adjusting the respective weighting values associated with connections between at least a portion of the nodes of the ANN.

14. The system of claim 13, wherein the user feedback is received after the object is placed at the drop-off spot, and wherein the control system is further configured to:
when the user feedback indicates that the recipient is dissatisfied with the determined drop-off spot, provide instructions to prompt the recipient to indicate an alternative drop-off spot within the delivery destination at which the recipient would have preferred the object to be placed.

15. A method comprising:
determining a delivery destination for an object to be delivered by an unmanned aerial delivery vehicle;
receiving, from a sensor connected to the unmanned aerial delivery vehicle, three-dimensional sensor data representing three-dimensional physical features of a physical environment of at least a portion of the delivery destination;
determining a drop-off spot for the object within the delivery destination by way of an artificial neural network (ANN) trained to determine the drop-off spot based on (a) a plurality of previously-designated drop-off spots designated for previously-delivered objects by respective object recipients, by respective human pilots, or by the ANN, or (b) a plurality of previously-designated pick-up spots designated by the respective object recipients for previously placed objects, wherein the ANN comprises (i) an input node configured to receive as input the three-dimensional sensor data, (ii) a plurality of hidden nodes connected to the input node, and (iii) an output node connected to one or more of the plurality of hidden nodes and configured to provide data indicative of a location of the drop-off spot within the delivery destination; and
providing instructions to cause the unmanned aerial delivery vehicle to move to the drop-off spot and place the object at the drop-off spot.

16. The method of claim 15, wherein the drop-off spot is an alternative drop-off spot, the method further comprising:
receiving data indicative of a user-selected drop-off spot within the delivery destination; determining, based on the sensor data, that the object cannot be placed at the user-selected drop-off spot; and in response to determining that the object cannot be placed at the user-selected drop-off spot, determining the alternative drop-off spot within the delivery destination by way of the ANN.

17. The method of claim 15, further comprising:

providing instructions to display, by a user interface of a computing device, a virtual model of an additional delivery destination, wherein the virtual model represents physical features of the additional delivery destination;

providing instructions to prompt, by the user interface, for designation of a target drop-off spot within the virtual model of the additional delivery destination to accumulate the plurality of previously-designated drop-off spots;

receiving, from the computing device, the designation of the drop-off spot within the virtual model; and storing in a database the designation of the drop-off spot within the virtual model.

18. The method of claim 17, further comprising:

providing instructions to display, by way of the user interface of the computing device, an indication of a reward for providing the designation of the drop-off spot.

19. The method of claim 15, further comprising:

training the ANN to determine the drop-off spot by determining respective weighting values associated with connections between nodes of the ANN based on the plurality of previously-designated drop-off spots.

20. A non-transitory computer readable storage medium having stored thereon instructions that, when executed by a computing device, cause the computing device to perform operations comprising:

determining a delivery destination for an object to be delivered by an unmanned aerial delivery vehicle;

receiving, from a sensor connected to the unmanned aerial delivery vehicle, three-dimensional sensor data representing three-dimensional physical features of a physical environment of at least a portion of the delivery destination;

determining a virtual model of the delivery destination based on the three-dimensional sensor data, wherein the virtual model is a three-dimensional model or a two-dimensional model that includes depth information;

determining a drop-off spot for the object within the delivery destination by way of an artificial neural network (ANN) trained to determine the drop-off spot based on (a) a plurality of previously-designated drop-off spots designated for previously-delivered objects by respective object recipients, by respective human pilots, or by the ANN, or (b) a plurality of previously-designated pick-up spots designated by the respective object recipients for previously placed objects, wherein the ANN comprises (i) an input node configured to receive as input the virtual model, (ii) a plurality of hidden nodes connected to the input node, and (iii) an output node connected to one or more of the plurality of hidden nodes and configured to provide data indicative of a location of the drop-off spot within the delivery destination; and providing instructions to cause the unmanned aerial delivery vehicle to move to the drop-off spot and place the object at the drop-off spot.

* * * * *